United States Patent
Kim

(10) Patent No.: US 8,798,201 B2
(45) Date of Patent: Aug. 5, 2014

(54) CODEWORD PERMUTATION AND REDUCED FEEDBACK FOR GROUPED ANTENNAS

(75) Inventor: Byoung-Hoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 861 days.

(21) Appl. No.: 11/850,451

(22) Filed: Sep. 5, 2007

(65) Prior Publication Data

US 2008/0080641 A1 Apr. 3, 2008

Related U.S. Application Data

(60) Provisional application No. 60/842,872, filed on Sep. 6, 2006.

(51) Int. Cl.
*H04L 27/00* (2006.01)

(52) U.S. Cl.
USPC .......................................... 375/299

(58) Field of Classification Search
USPC .......................................... 375/299
See application file for complete search history.

(56) References Cited

U.S. PATENT DOCUMENTS

| | | | |
|---|---|---|---|
| 5,852,630 A | 12/1998 | Langberg et al. | |
| 6,000,054 A | 12/1999 | Bahr et al. | |
| 6,084,919 A | 7/2000 | Kleider et al. | |
| 6,542,485 B1 | 4/2003 | Mujtaba | |
| 6,802,035 B2 | 10/2004 | Catreux et al. | |
| 6,850,481 B2 | 2/2005 | Wu et al. | |
| 6,888,809 B1 | 5/2005 | Foschini et al. | |
| 6,907,269 B2 | 6/2005 | Yamaguchi et al. | |
| 6,970,682 B2 | 11/2005 | Crilly, Jr. et al. | |
| 7,020,446 B2 | 3/2006 | Mehta et al. | |
| 7,039,356 B2 | 5/2006 | Nguyen | |
| 7,103,384 B2 | 9/2006 | Chun | |
| 7,184,713 B2 | 2/2007 | Kadous et al. | |

(Continued)

FOREIGN PATENT DOCUMENTS

| | | |
|---|---|---|
| AR | 050795 A1 | 11/2006 |
| CA | 2400517 | 4/2003 |

(Continued)

OTHER PUBLICATIONS

Molisch, et al., MIMO systems with antenna selection, IEEE Microwave Magazine, XP002411128 URL:http://ieeexplore.ieee.org/iel5/6668/28677/01284943.pdf, Retrieved on Dec. 8, 2006, pp. 46-56 (2004).

(Continued)

*Primary Examiner* — Michael Neff
(74) *Attorney, Agent, or Firm* — Kenyon S. Jenckes

(57) ABSTRACT

Systems and methodologies are described that facilitate reducing feedback required to be transmitted on a reverse link channel in response to a forward link data transmission for multiple-input multiple-output (MIMO) wireless communication systems. In a per group rate control MIMO system, a codeword can be linked to more than one layer. Codewords are mixed among antennas in the MIMO systems based upon a symmetric permutation of antennas groups. Further, codewords are transmitted in permuted form so that receivers can reduce feedback to a base channel quality indicator (CQI) and a differential CQI. Additionally, spatial diversity is increased for each codeword improving the robustness of the system against inaccurate CQI reports.

27 Claims, 18 Drawing Sheets

(56) References Cited

U.S. PATENT DOCUMENTS

| | | | |
|---|---|---|---|
| 7,248,841 B2 | 7/2007 | Agee et al. | |
| 7,260,366 B2 | 8/2007 | Lee et al. | |
| 7,280,622 B2 | 10/2007 | Love et al. | |
| 7,298,805 B2 | 11/2007 | Walton et al. | |
| 7,321,563 B2 | 1/2008 | Kim et al. | |
| 7,412,212 B2* | 8/2008 | Hottinen | 455/101 |
| 7,508,880 B2 | 3/2009 | Yun et al. | |
| 7,711,330 B2 | 5/2010 | Yang et al. | |
| 8,073,068 B2 | 12/2011 | Kim et al. | |
| 2003/0137955 A1 | 7/2003 | Kim et al. | |
| 2003/0185310 A1 | 10/2003 | Ketchum et al. | |
| 2003/0235255 A1 | 12/2003 | Ketchum et al. | |
| 2004/0018818 A1 | 1/2004 | Hottinen et al. | |
| 2004/0120411 A1 | 6/2004 | Walton et al. | |
| 2004/0136349 A1 | 7/2004 | Walton et al. | |
| 2004/0190640 A1 | 9/2004 | Dubuc et al. | |
| 2004/0267778 A1 | 12/2004 | Rudolph et al. | |
| 2005/0009476 A1 | 1/2005 | Wu et al. | |
| 2005/0031044 A1 | 2/2005 | Gesbert et al. | |
| 2005/0047517 A1 | 3/2005 | Georgios et al. | |
| 2005/0052991 A1 | 3/2005 | Kadous | |
| 2005/0128983 A1 | 6/2005 | Kim et al. | |
| 2005/0135499 A1 | 6/2005 | Nam et al. | |
| 2005/0157807 A1 | 7/2005 | Shim et al. | |
| 2005/0220211 A1 | 10/2005 | Shim et al. | |
| 2005/0276347 A1 | 12/2005 | Mujtaba et al. | |
| 2005/0288014 A1* | 12/2005 | Rajkotia et al. | 455/433 |
| 2006/0023745 A1 | 2/2006 | Koo et al. | |
| 2006/0050770 A1 | 3/2006 | Wallace et al. | |
| 2006/0067421 A1 | 3/2006 | Walton et al. | |
| 2006/0093062 A1 | 5/2006 | Yun et al. | |
| 2006/0104382 A1 | 5/2006 | Yang et al. | |
| 2006/0111054 A1 | 5/2006 | Pan et al. | |
| 2006/0115014 A1 | 6/2006 | Jeong et al. | |
| 2006/0205357 A1 | 9/2006 | Kim | |
| 2006/0209980 A1 | 9/2006 | Kim et al. | |
| 2006/0286974 A1 | 12/2006 | Gore et al. | |
| 2007/0041457 A1 | 2/2007 | Kadous et al. | |
| 2007/0105503 A1 | 5/2007 | Kim | |
| 2007/0254652 A1* | 11/2007 | Khan et al. | 455/435.1 |
| 2008/0080641 A1* | 4/2008 | Kim | 375/299 |
| 2008/0209115 A1 | 8/2008 | Maeda et al. | |

FOREIGN PATENT DOCUMENTS

| | | |
|---|---|---|
| EP | 1376920 | 1/2004 |
| EP | 1655874 | 5/2006 |
| JP | 2002217752 | 8/2002 |
| JP | 2004320434 | 11/2004 |
| JP | 2005509359 | 4/2005 |
| JP | 2005223450 | 8/2005 |
| JP | 20050535167 | 11/2005 |
| JP | 2006520109 | 8/2006 |
| JP | 2007509534 | 4/2007 |
| JP | 2007512760 | 5/2007 |
| JP | 2008521353 | 6/2008 |
| JP | 2008526122 | 7/2008 |
| JP | 2009506656 | 2/2009 |
| JP | 4819897 | 9/2011 |
| JP | 2012100288 | 5/2012 |
| KR | 20030062135 A | 7/2003 |
| KR | 20040073551 | 8/2004 |
| KR | 20050015731 | 2/2005 |
| KR | 20060092991 A | 8/2006 |
| RU | 2208911 | 7/2003 |
| RU | 2257609 | 7/2005 |
| RU | 2264010 | 11/2005 |
| TW | I230525 | 3/2002 |
| TW | 200503558 | 1/2005 |
| TW | I231666 | 4/2005 |
| WO | WO0001362 A1 | 1/2000 |
| WO | WO2004019447 | 3/2004 |
| WO | WO2004107693 | 12/2004 |
| WO | 2005053186 A1 | 6/2005 |
| WO | 2005109717 | 11/2005 |
| WO | WO2005107125 | 11/2005 |
| WO | WO2006028204 A1 | 3/2006 |
| WO | WO2006030867 | 3/2006 |
| WO | WO2006059566 | 6/2006 |
| WO | 2007024913 | 3/2007 |
| WO | 2008050996 | 5/2008 |
| WO | 2008058112 | 5/2008 |

OTHER PUBLICATIONS

Mui, "Successive interference cancellation for cdma2000 using a software defined radio," IEEE Wireless Communications and Networking Conference, 2006, vol. 3, pp. 1591-1596.

3GPP TSG RAN WG1 #42; "MIMO OFDMA Techniques for Downlink E-UTRA," 3GPP, R1-050724, pp. 1-6, Texas Instruments, London, UK, Aug. 29-Sep. 2, 2005.

3GPP TSG RAN WG1 #46; "Performance of per group rate control (PGRC) with advanced MIMO Receiver," 3GPP, R1-062015, pp. 1-6, Texas Instruments, Tallinn, Estonia, Aug. 28-Sep. 1, 2006.

Partial International Search Report—PCT/US2007/077536, International Searching Authority—European Patent Office—Mar. 31, 2008.

3GPP TS 36.211 v0.0.0; "3rd Generation Partnership Project; Technical Specification Group Radio Access Network; Evolved UMTS Terrestrial Radio Access; Physical Channels and Modulation (Release x)," 3GPP Technical Specification, Sep. 2006.

3GPP2 C.S0084-001-0 v1.0; "3rd Generation Partnership Project 2; Physical Layer for Ultra Mobile Broadband (UMB) Air Interface Specification," 3GPP2 C.S0084-001-0 version 1.0, Apr. 5, 2007.

International Search Report—PCT/US2007/077536, International Searching Authority—European Patent Office—Aug. 6, 2008.

Written Opinion—PCT/US2007/077536, International Searching Authority—European Patent Office—Aug. 6, 2008.

International Preliminary Report on Patentability, PCT/US2007/077536—The International Bureau fo WIPO—Geneva, Switzerland. Mar. 10, 2009.

Knopp R et al: "Power control schemes for TDD systems with multiple transmit and receive antennas" Global Telecommunications Conference—GLOBECDM '99, 1999, pp. 2326-2330, XP010373369.

Kousa M A et al: "Multichannel Adaptive System" IEE Proceedings I. Solid-State & Electron Devices, Institution of Electrical Engineers. Stevenage, GB, vol. 140, No. 5, Part 1, Oct. 1, 1993, pp. 357-364, XP000403498 ISSN: 0956-3776.

Andreas et al., "MIMO systems with antenna selection," IEEE Microwave Magazine, URL:http//ieee/org/iel5/6668/28677/01284943/pdf, Retrieved on Dec. 8, 2006, pp. 36-56 (2004).

Taiwan Search Report—TW096133297—TIPO—Jun. 24, 2011.

European Search Report—EP12006467—Search Authority—Munich—Dec. 6, 2012.

Qualcomm Europe: "Description of Single and Multi Codeword Schemes with Precoding", 3GPP TSG-RAN WG1 #44, R1-060457, Feb. 13-17, 2006, pp. 9.

Qualcomm Europe: "MIMO proposal for MIMO-WCDMA evaluation", 3GPP TSG-RAN WG1#42, R1-050912, Aug. 29-Sep. 2, 2005, pp. 21.

* cited by examiner

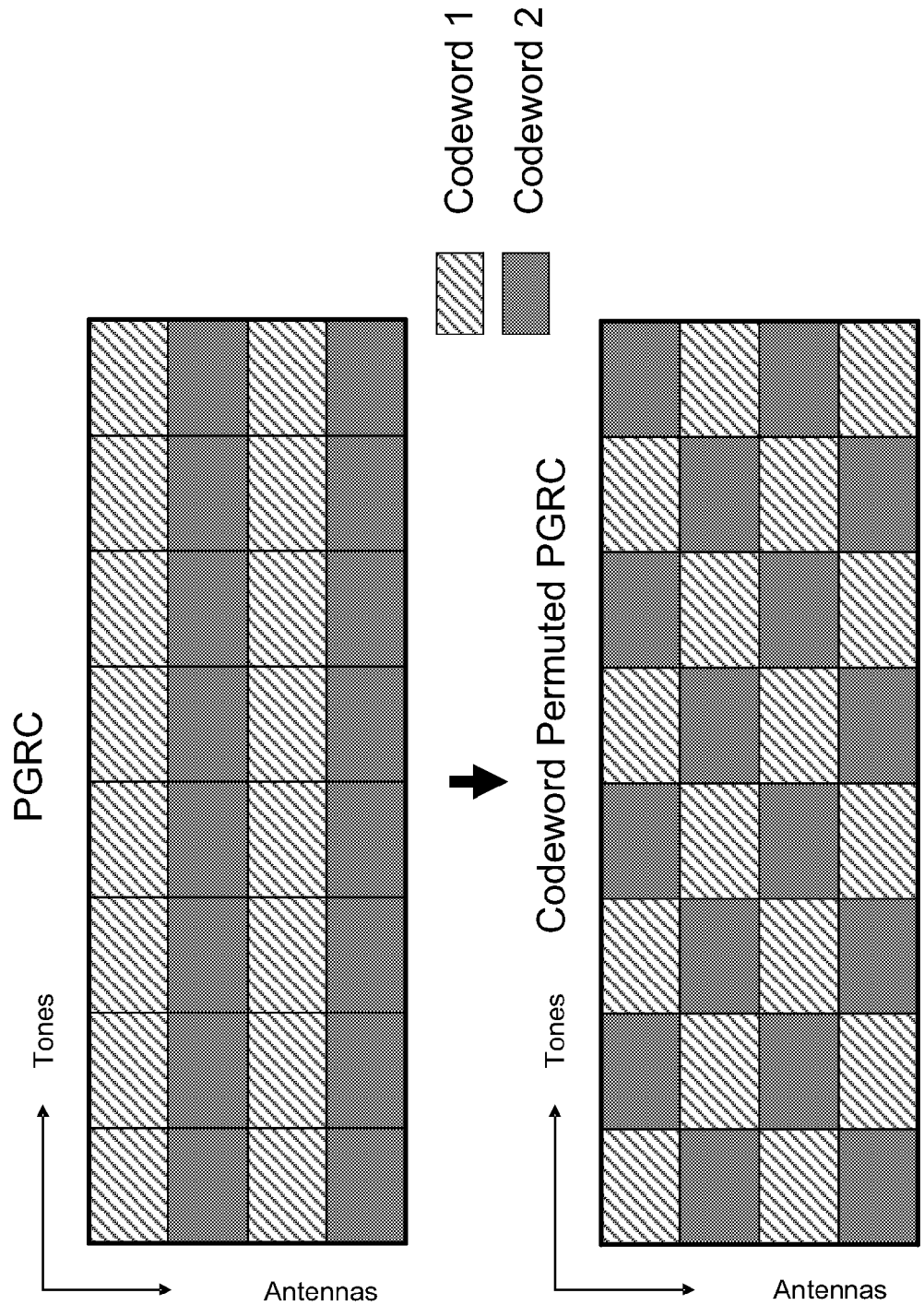

CODEWORD PERMUTATION AND REDUCED FEEDBACK FOR GROUPED ANTENNAS

CROSS-REFERENCE TO RELATED APPLICATIONS

This application claims the benefit of U.S. Provisional Patent application. Ser. No. 60/842,872 entitled. "A METHOD AND APPARATUS FOR CODEWORD PERMUTATION AND REDUCED FEEDBACK FOR GROUPED ANTENNAS" which was filed Sep. 6, 2006. The entirety of the aforementioned application is herein incorporated by reference.

BACKGROUND

I. Field

The following description relates generally to wireless communications, and more particularly to codeword permutation for grouped antennas in a wireless communication system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ... ). Examples of such multiple-access systems may include code division multiple access (CDMA) systems, time division multiple access (TDMA) systems, frequency division multiple access (F DMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

MIMO systems may support various duplexing techniques to divide, forward and reverse link communications over a common physical medium. For instance, frequency division duplex (FDD) systems may utilize disparate frequency regions for forward and reverse link communications. Further, in time division duplex (TDD) systems, forward and reverse link communications may employ a common frequency region. However, conventional techniques may provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects and corresponding disclosure thereof, various aspects are described in connection with, facilitating reduced feedback required to be transmitted on a reverse link channel in response to a forward link data transmission for multiple-input multiple-output (MIMO) wireless communication systems. In particular, in a MIMO system implementing a per group rate control (PGRC) scheme, codewords can be, linked to more than one layer. Codewords are permuted among antennas based upon a symmetrical permutation of antennas groups. Further, codewords are transmitted in permuted form so that receivers can condense feedback to a base channel quality indicator (CQI) and a differential CQI representing a quality increase resulting from cancelling the interference created by the codeword associated with the base CQI.

According to related aspects, a wireless communications system employing codeword permutation is described herein. In an aspect, a method that facilitates reducing required feedback for data rate control in wireless communication, the method determining one or more groupings of a plurality of transmit antennas, permuting data stream codewords according to a permutation of the antenna groupings and transmitting the permuted codewords through the one or more of groupings of transmit antennas over a forward link channel.

In accordance with another aspect, a wireless communications apparatus employable in a multiple-input, multiple-output system, comprises means for identifying a level of codeword to layer correspondence, means for formulating groups of transmit antennas based at least in part on the level of codeword correspondence and means for performing symmetrical permutations of at least two codewords.

In accordance with yet another aspect, a wireless-communications apparatus comprises a memory that retains instructions related to grouping transmit antennas, permuting codeword symbols based upon the antenna groupings and utilizing feedback to adjust transmission performance and a processor, coupled to the memory, configured to execute the instructions retained in the memory.

According to another aspect, A machine-readable medium having stored thereon machine-executable instructions for grouping transmit antennas based upon a correspondence between codewords and layers, shuffling codeword blocks across antenna groupings based upon symmetrical permutations of the groupings, transmitting the shuffled codeword blocks via a forward link channel through the transmit antennas, receiving a condensed feedback metric relating to the transmission of shuffled codewords and adjusting subsequent transmissions based at least in part on the received feedback.

In accordance with yet another aspect, a method that generates reduced feedback in a wireless communication system comprises unmixing permuted codeword blocks according to a permutation scheme employed during transmission, regenerating interference created by a first codeword during transmission, evaluating a channel quality indicator (CQI) related to the first codeword and evaluating a differential CQI related to quality increase resulting from cancelling the regenerated interference in decoding a second codeword.

According to yet another aspects, in a wireless communication system, an apparatus comprises a processor configured to reconstruct at least two codewords received in a permuted form, determine a base CQI reflecting the signal quality of a first codeword of the at least two codewords and calculate a delta CQI based upon the signal gain obtained in a second codeword.

In accordance with another aspect, A wireless communications apparatus that calculates reduced feedback by employing successive interference cancellations on permuted codewords comprises means for receiving permuted codewords on a plurality of receiver antennas, means for reconstructing codewords based upon the permuted codewords received, means for regenerating interference created by a first codeword during transmission and means for cancelling the regenerated interference while decoding a second codeword.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 5a-g are illustrations of an example permutation schemes in accordance with an aspect of the subject disclosure.

DETAILED DESCRIPTION

Figure 1:
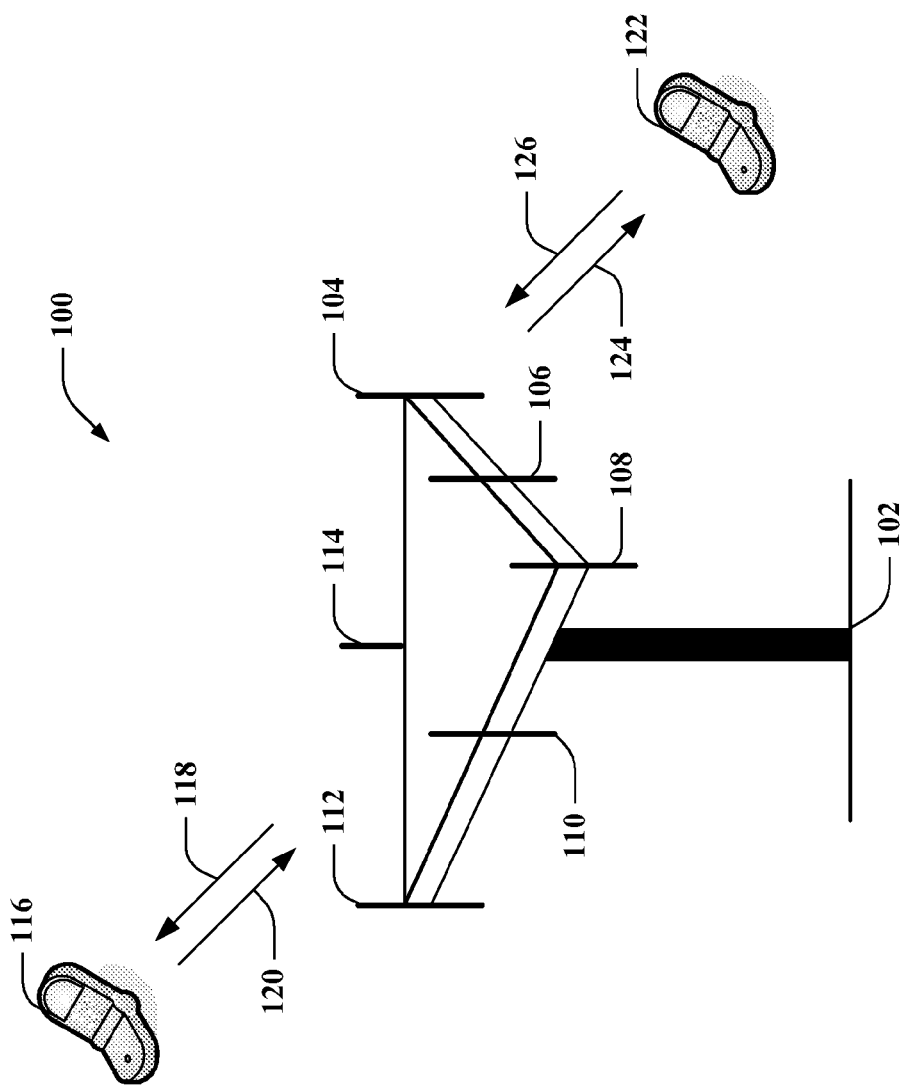
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific-details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant: (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 may utilize a different frequency band than that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

The set of antennas and/or the area in which they are designated to communicate may be referred to as a sector of base station 102. For example, multiple antennas may be designed to communicate to mobile devices in a sector of the areas covered by base station 102. In communication over forward links 118 and 124, the transmitting antennas of base station 102 may utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices.

According to an example, system 100 may be a multiple-input multiple-output (MIMO) communication system. Further, system 100 may utilize any type of duplexing technique to divide communication channels (e.g., forward link, reverse link, . . . ) such as FDD, TDD, and the like. Moreover, system 100 may employ codeword permutation to reduce amount of feedback required to improve subsequent transmissions and increase spatial diversity for each codeword. Pursuant to an illustration, base station 102 may transmit over forward links 118 and 124 to mobile devices 116 and 122. Base station 102 may mix codewords between antennas groups and/or layers based upon a number of active antennas in the MIMO communication system and the level of correspondence between codewords and layers. Base station 102 transmits codewords over forward links 118 and 124 in permuted form so that each codewords transmits in part on all selected antennas in the MIMO communication system. Mobile devices 116 and 122 receive the permuted transmission from base station 102 via respective forward links 118 and 124. Mobile devices 116 and 122 are aware of the permutation scheme employed by base station 102. Accordingly, mobile device 116 and 122 can unmix and reconstruct the original codewords after receiving permuted codewords through respective forward links 118 and 124. In addition, mobile devices 116 and 122 may determine feedback to be provided to base station 102 related to the permuted transmission. For example, mobile devices 116 and 122 may utilize a condensed feedback metric as opposed to providing separate values for each individual channel, antenna, codeword or the like. According to an illustration, a single quality value accurately representative of all forward link channels may be transmitted from one of the mobile devices 116 and 122 to base station 102; however, the claimed subject matter is no so limited. The feedback may be transmitted over a reverse link channel to base station 102.

Base station 102 may obtain channel related feedback from mobile devices 116 and 122. Further, base station 102 may utilize the feedback to adjust subsequent transmissions to mobile devices 116 and 112. According to an example, base station 102 transmits multiple output streams to mobile device 116 in a MIMO environment according to a permutation of the output streams (i.e., mixing the output streams among the output antennas). The multiple output streams, when permuted, experience substantially similar conditions, on average, during transmission to enable providing simplified feedback relating to all output streams from mobile device 116 to base station 102; likewise, base station 102 and mobile device 122 may employ permutations in a substantially similar manner. Further, mobile devices 116 and 122 may employ interference cancellation techniques. Base station 102 may utilize the simplified feedback (e.g., composed of an average channel quality indicator and one or more incremental channel quality indicators) to adjust subsequent transmissions for all output streams over the forward link channel.

Figure 2:
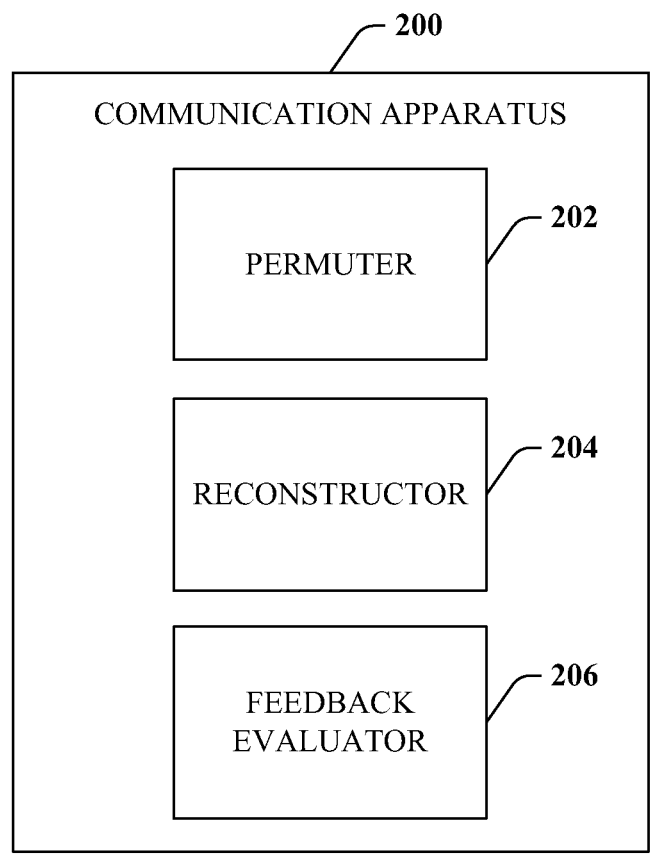
FIG. 2 is an illustration of an example communications apparatus for employment within a wireless communications environment.

Turning to FIG. 2, illustrated is a communications apparatus 200 for employment within a wireless communications environment. Communications apparatus 200 may be a base station or a portion thereof or a mobile device or a portion thereof. According to an illustration, communication apparatus 200 can be employed in a. MIMO system where multiple antennas are employed to transmit and receive data transmission. The antennas can be physical or virtual antennas. A physical antenna is an antenna employed to radiate a signal and typically has a limited maximum transmit power. A virtual antenna is an antenna through which data can be transmitted but the virtual antenna does not necessarily radiate a signal. According to one example, a virtual antenna can be associated with a beam formed by combining multiple physical antennas through a vector of coefficients. Multiple virtual antennas are possible by associating each virtual antenna to some or all physical antennas through various mapping techniques.

Communication apparatus 200 is applicable to multi-codeword MIMO systems. One multi-codeword MIMO scheme is Per Antenna Rate Control (PARC), or Selective Per Antenna Rate Control (SPARC). In a (S)PARC scheme, one codeword corresponds to one layer of a MIMO system. A layer can be a data stream, a physical antenna, a virtual antenna or the like. Accordingly, in the (S)PARC scheme, each physical and/or virtual antenna transmits and/or receives a separate data stream simultaneously. Each data stream can be encoded at varying data rates based upon, among other things, interference experienced by a channel conveying the data stream. Higher throughput is achieved by employing multiple transmit antennas and multiple receiver antennas to create a plurality of channels that can be spatially distinguished. One difficulty presented by MIMO systems is maximizing throughput for each channel and minimizing amount of feedback required to achieve maximization. For example, a channel quality indicator (CQI) is fed back for each channel so that the transmitter can maximize throughput by adjusting data rates on all channels. It is to be appreciated that a CQI can include a signal-to-noise ratio (SNR), a signal-to-interference plus noise ratio (SINR), or other such metrics and/or a value computed from such measured quantities. This feedback based throughput maximization approach consumes a large amount of uplink or reverse link resources in providing a CQI for each of the multiple channels.

Communications apparatus 200 can include a permuter 202 that permutes data streams over a plurality of antennas. In a (S)PARC scheme, permuter 202 can perform layer permutations such that each data stream is transmitted in part via all or a selected subset of physical and/or virtual antennas. For example, a MIMO system can have four physical antennas and transmit a separate data stream on each of the four antennas. Permuter 202 permutes frames of the data streams so that portions of any given data stream transmit on all four antennas. Beforehand, the data streams are conventionally encoded, interleaved and mapped to modulation symbols. However, prior to transmission by the transmit antennas, the modulation symbols are mixed according to a cycling or pseudo-random pattern by permuter 202. By way of illustration and not limitation, a first block of each data stream is transmitted via a first combination of MIMO channels. For example, four data streams numbered 1 through 4 are to be transmitted over four MIMO channels numbered 1 through 4. The first block of data streams 1 through 4 can be transmitted by MIMO channels 1 through 4 respectively. Then, a second block of the data streams 1 through 4 can be transmitted, by MIMO channels 2, 3, 4 and 1 respectively. The third blocks can be transmitted by channels 3; 4, 1 and 2, respectively. The remaining blocks can be transmitted in this manner by cycling through each of the four simple cycling permutations or the full 24 possible permutations of MIMO channels 1 through 4. If only two or three streams are transmitted, the cycling or pseudo-random permutations can be applied to only the selected subset of physical and/or virtual antennas. Each block may correspond to each subcarrier or group of subcarriers in the frequency-domain transmission (e.g., OFDMA). In addition, each block may correspond to each time-domain symbol or group of symbols in the time-domain transmission (e.g., single carrier FDMA, CDMA, etc.).

Permuting the data streams on a set of MIMO channels according to a full permutation of channel combinations enables a condensed metric to be utilized as feedback. The blocks of each data stream are transmitted over all MIMO channels. Accordingly, each of the data streams have experienced the same channel conditions on average provided that the channel remains nearly static during the transmission of the blocks of data stream for each period of permutation. The similar channel conditions results in similar. CQIs (e.g. SNR, SINR or other such metric). For example, the respective SNRs for each of the data streams should be well behaved and only vary based upon any successive interference cancellation performed on the multiple data streams. The respective SNRs can be represented with reasonable accuracy by a condensed form more compact than providing separate SNR measurements for each MIMO channel. For example, the condensed form can include a reference SNR and a delta or differential SNR. The reference SNR can correspond to the SNR value of a first decoded data stream and the delta SNR value corresponds to the difference between successive data streams resulting from successive interference cancellation.

The transmitter of the permuted data streams receives the condensed SNR via the reverse link or uplink. The transmitter can employ the condensed SNR value to adjust the data rates with which to encode subsequent data streams. For example, the transmitter assumes the reference SNR included in the condensed SNR is equal to the SNR measured by the receiver for one data stream. The transmitter will utilize this SNR to adjust of the data rate of the matching data stream. For the second data stream, the transmitter assumes the measured SNR is equal to the sum of the reference SNR and the delta SNR and adjust the data rate accordingly. For the next data stream, the transmitter utilizes the sum of the reference SNR and two-times the delta SNR to adjust the data rate and so on for each data stream thereafter.

On the receiver side, a corresponding communication apparatus similar to apparatus 200 receives the permuted data streams mixed by permuter 204. The receiver side communication apparatus can be a mobile device, or portion thereof if communication apparatus 200 is a base station or a portion thereof. Conversely, if communication apparatus 200 is a mobile device or portion thereof, the receiver side apparatus can be a base station or portion thereof. The receiver side apparatus includes reconstructor 204 that unmixes the permuted data streams transmitted. The reconstructor 204 is aware of the permutation scheme employed by permuter 202 to mix the data streams across the channels. The reconstructor 204 receives the blocks from each of the MIMO channels and reconstructs the original data streams. The reconstructed data streams are analyzed by a feedback evaluator 206 to determine the SNRs of the data streams or some other CQI values as, described above. Alternatively, the MIMO channel estimates obtained via reference signals or pilot signals can be employed in conjunction with the permutation scheme to derive the SNRs or other CQI values.

Communication apparatus 200 can be employed in a variety of multi-codeword MIMO systems in addition to the (S)PARC scheme described above. For example, communication apparatus 200 is applicable to a Per Group Rate Control (PGRC) multi-codeword MIMO scheme.

Figure 3:
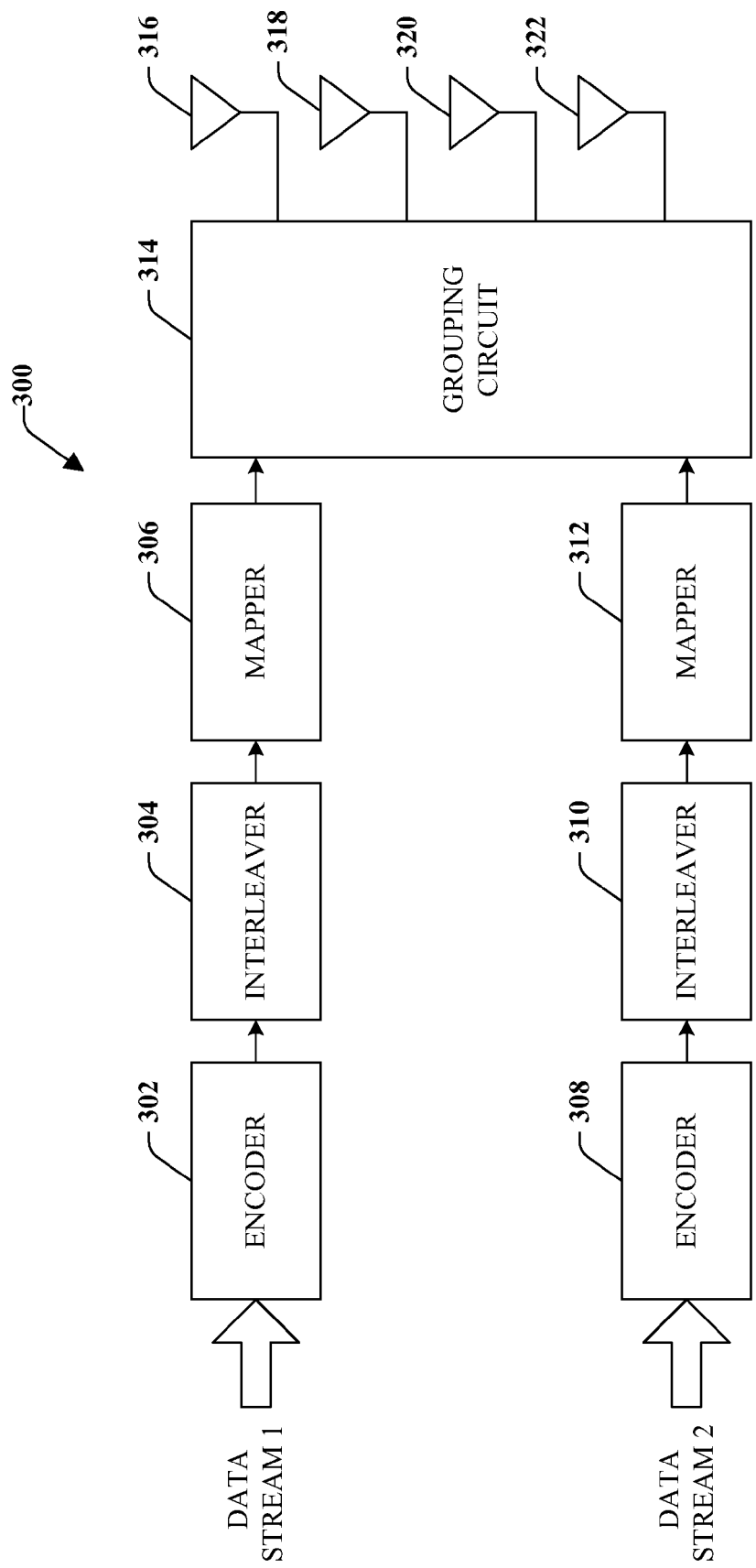
FIG. 3 is an illustration of an example wireless communications system that implements a per group rate control scheme.

Turning briefly to FIG. 3, illustrated is an exemplary wireless communication system 300 that implements a PGRC scheme. System 300 includes two data streams (i.e., Data Stream 1 and Data Stream 2) and four transmit antennas 316-322. Thus, system 300 can be described as a 4×4 MIMO system. It is to be appreciated that additional antennas and data streams can be utilized to expand the MIMO system. Data Stream 1 is encoded at a first data rate by an encoder 302. In one example, encoder 302 partitions Data Stream 1 into binary blocks of a specified length and the blocks are mapped into a binary codeword. The codeword associated with Data Stream 1 is interleaved by interleaver 304. Interleaving is a process by which block of a data stream are rearranged or reordered in a non-contiguous manner so as to improve performance. Mapper 306 receives the interleaved stream and maps it to modulation symbols to be transmitted via the antennas. Encoder 308, interleaver 310 and mapper 312 perform a similar operation with respect to Data Stream 2.

Following the processing of the data streams, a grouping circuit 314 distributes the encoded data streams between the plurality of antennas 316-322. In one possible distribution, antenna 316 can transmit a first portion of encoded data stream 1 and antenna 318 can transmit a second portion of encoded data stream 1. Accordingly, antennas 320 and 322 transmit a first and second portion of encoded data stream 2 respectively. It is to be appreciated that a variety of other groupings can be employed. For example, grouping circuit 314 can allocate antennas 316 and 320 for encoded data stream 1 and antennas 318 and 322 for encoded data stream 2. In the exemplary system depicted in FIG. 3 with two data streams and four antennas, grouping circuit 314 can choose among six possible combinations. Depending on the reported channel rank, only a part of the antennas are selected and utilized for data transmission. For example, only the antennas 316, 318, and 320 may be used to transmit two data streams. In this case, Data Stream 1 may be transmitted through the antenna 316 and Data Stream 2 may be transmitted through the antennas 318 and 320. It is to be appreciated that the antennas 316-322 may be either physical antennas and/or virtual antennas.

Referring back to FIG. 2, the permutation and differential feedback concepts, described above with reference to the (S)PARC scheme, can be applied to the PGRC multi-codeword scheme. In the (S)PARC scheme, one codeword corresponds to one layer (e.g., data stream, physical antenna, virtual antenna . . . ). In the PGRC scheme described with respect to FIG. 3, one codeword corresponds to one or two layers. In other words, one encoded data stream can be transmitted on one or two antennas. Permuting on the layer level may not achieve the desired performance increases in some cases because a codeword can correspond to two physical or virtual antennas. Many layer combinations result in an effectively identical arrangement as the original. The only difference being the codeword portions associated with a particular group of two antennas are swapped. In other words, if a first portion of a codeword is to be transmitted on a first antenna and a second portion a codeword on a second antenna, one possible layer permutation merely results in the first portion being transmitted on the second antenna and the second portion on the first antenna. Accordingly, in a PGRC scheme, permutation should ideally occur on a codeword level.

Permuter 202 permutes codewords in accordance with the number of active physical or virtual antennas and the number of layers coupled to each codeword. For example, in a 4×4 MIMO system (i.e., 4 input layers and 4 output layers) employing a PGRC scheme, permuter 202 and communication apparatus 200 perform one of four operations depending on codeword correspondence and antenna activity. First, if only one antenna is active, communication apparatus 200 transmits data as one stream through the sole active antenna. Permuter 202 does not permute the data streams as there is only one combination in this instance. Second, if two antennas are active and each codeword corresponds to two layers, communication apparatus 200 transmits the data stream through the two active antennas as a group. A first portion of the data stream transmits through one of the two antennas and a second portion transmits through the other antenna of the group. Permuter 202 can symmetrically permute the data stream portions transmitted via the two antennas but such action does not attain any additional benefits. In this situation, the feedback essential for data rate adjustment is a base CQI reflecting the average effective SINR of the two active antennas.

Third, if two antennas are active and each codeword corresponds to a single layer, then there are two codewords. Communication apparatus 200 transmits the data as two streams encoded at different data rates with each stream transmitting through one of the two active antennas. Permuter 202 symmetrically permutes the two codewords across the two active antennas. In this example, successive blocks of a given codeword are transmitted through different antennas. For example, a first block of a codeword is transmitted through a first antenna, a second block through a second antenna, a third block through the first antenna, and so on. Blocks of a second codeword follow a complimentary permutation pattern. Permuting the codewords in this manner results in each codeword experiencing substantially the same channel conditions. Thus, the feedback comprises a base CQI reflecting the SINR of one of the codewords and a differential CQI reflecting the SINR gain obtained by cancelling interference of one codeword through successive interference cancellation. Moreover, each codeword can experience an increased spatial diversity, which improves the robustness of the system when the reported CQI is inaccurate due to the reporting delay, channel estimation error, and others. Therefore, with two active antennas and each codeword corresponding to one layer, permuter 202 performs essentially the same in a PGRC scheme as with a (S)PARC scheme described supra.

Fourth, if three antennas are active, a codeword may correspond to a single layer while the other codeword may correspond to two layers. In this case, permuter 202 should symmetrically permute the two codewords across the three active antennas. Accordingly, permuter 202 can operate in situation where the codeword-to-layer correspondence is not equivalent for all codewords.

Finally, if four antennas are active and each codeword corresponds to two layers, communication apparatus 200 communicates data as two data streams encoded at different data rates with each data stream transmitting through a group of two antennas. Permuter 202 symmetrically permutes the two codewords across the two groups of antennas. The permutation scheme applied depends upon the antenna grouping utilized. The details of the permutation schemes are described infra.

The permuted codewords improve in terms of spatial diversity and experience substantially similar channel conditions resulting in well-behaved SINR values. The receiver employs successive interference cancellation to improve the SINR of the second data stream. Reconstructor 204 on the receiver side unmixes the two codewords. Reconstructor 204 is aware of the permutation scheme utilized by permuter 202 of the transmitter to mix the codewords. One of the two codewords is reconstructed and decoded. Feedback evaluator 206 measures the SINR value of the first decoded codeword or data stream. Feedback evaluator 206 employs the decoded data stream to reconstruct or regenerate the interference that it created during transmission. The regenerated interference can be cancelled out of the superposition of the data streams. Thus, the second data stream or codeword can be decoded with less interference, resulting in a higher SINR value for the stream. Accordingly, the essential feedback is a base CQI representing the SINR of the first decoded codeword or data stream and a differential CQI representing the SINR gain obtained by cancelling the interference of the first codeword by successive interference cancellation.

Figure 4:
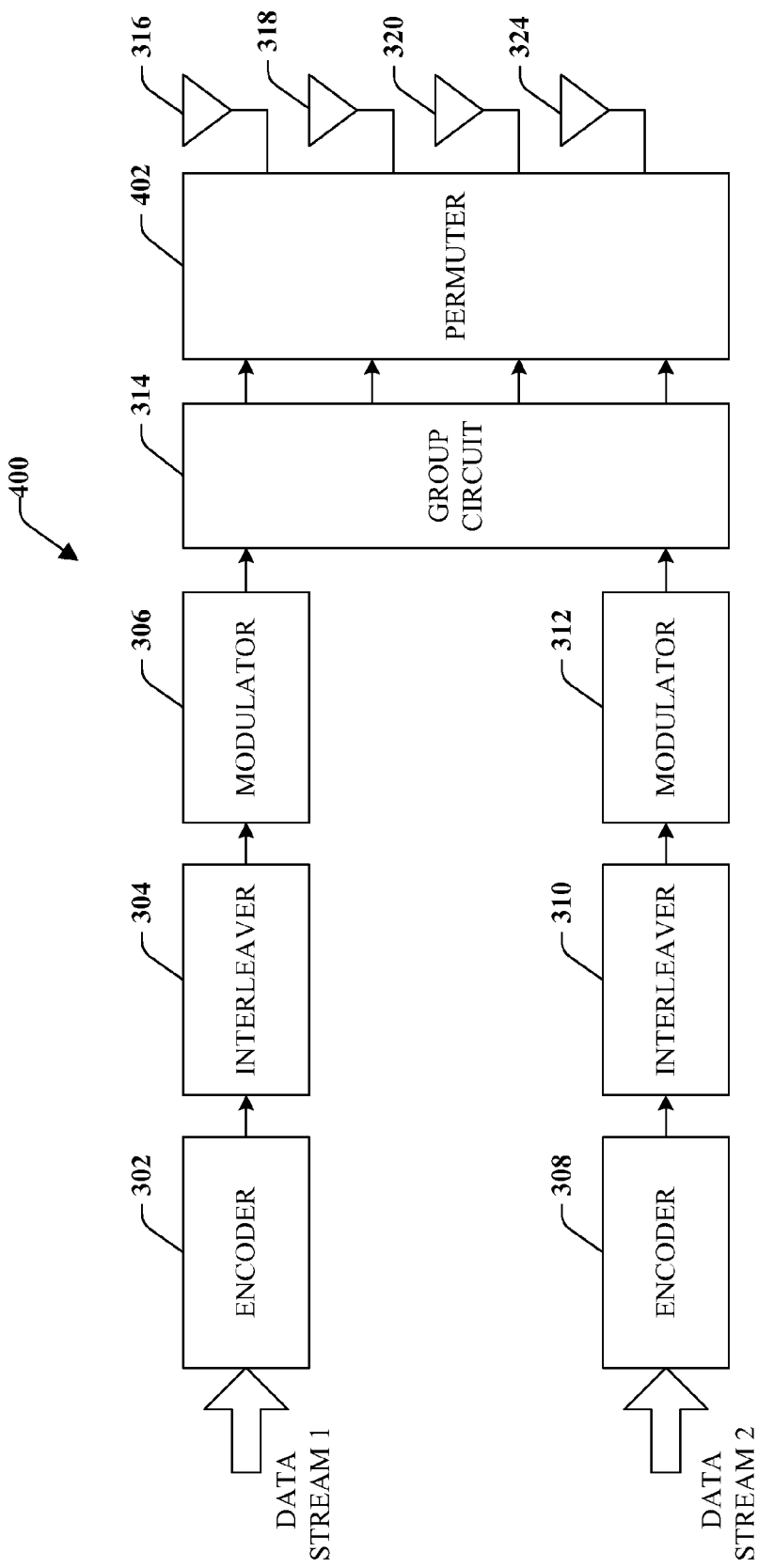
FIG. 4 is an illustration of an example wireless communications system that effectuates codeword permutation in MIMO environment.

Turning to FIG. 4, illustrated is a wireless communication system 400 that effectuates codeword permutation in a MIMO system employing a PGRC scheme. System 400 includes two data streams (i.e., Data Stream 1 and Data Stream 2) and four transmit antennas 316-322. Thus, system 400 is a 4×4 MIMO system. Data Stream 1 is encoded at a first data rate by an encoder 302. In one example, encoder 302 partitions Data Stream 1 into binary blocks of a specified length and the blocks are mapped into a binary codeword. The codeword associated with Data Stream 1 is interleaved by interleaver 304. Interleaving is a process by which block of a data stream are rearranged or reordered in a non-contiguous manner so as to improve performance. Mapper 306 receives the interleaved stream and maps it to modulation symbols to be transmitted via the antennas. Encoder 308, interleaver 310 and mapper 312 perform a similar operation with respect to Data Stream 2.

Following the processing of the data streams, a grouping circuit 314 distributes the encoded data streams between the plurality of antennas 316-322. In one possible distribution, antenna 316 can transmit a first portion of encoded data stream 1 and antenna 318 can transmit a second portion of encoded data stream 1. Accordingly, antennas 320 and 322 can transmit a first and second portion of encoded data stream 2 respectively. It is to be appreciated that a variety of other groupings can be employed. For example, grouping circuit 314 can allocate antennas 316 and 320 for encoded data stream 1 and antennas 318 and 322 for encoded data stream 2. In the exemplary system depicted in FIG. 4 with two data streams and 4 antennas, grouping circuit 314 can choose among six possible combinations.

System 400 further includes a permuter 402 that facilitates codeword permutation according to one aspect of the subject disclosure. Permuter 402 receives the antenna grouping from group circuit 314 and symmetrically mixes or permutes the two codewords over both antenna groups. Some exemplary permutation schemes are shown infra with respect to FIGS. 5a-c. In exemplary system 400, the number of active antennas is assumed to be four, in which case there are six possible antenna groupings that map each codeword to two antennas and six corresponding inter-codeword permutation schemes. Moreover, for each inter-codeword permutation schemes, there are four different intra-codeword permutation schemes, but different intra-codeword permutation schemes for an inter-codeword permutation do not contribute to further improving the system robustness, spatial diversity, and/or feedback information reduction in this example. Following permutation, each block of a codeword is transmitted through a different antenna group than the previous block. For example, if the first block of a codeword is transmitted through an antenna grouping comprises antennas 316 and 318, the second block of the codeword is transmitted through the second antenna grouping comprising antennas 320 and 322.

Referring now to FIGS. 5a-g, exemplary codeword permutation schemes are depicted. For the purposes of simplicity of explanation, the examples illustrate four antennas and two codewords. Those skilled in the art should appreciate how the permutation schemes can be applied to systems including a greater or lesser number of antennas and codewords. The depicted schemes are exemplary of those utilized in system 400 of FIG. 4. While six possible antenna groupings are possible in system 400, three groupings are symmetrical reflections of the other three. Accordingly, FIGS. 5a-g individually illustrate the three overall groupings absent the reflections.

Figure 5A:
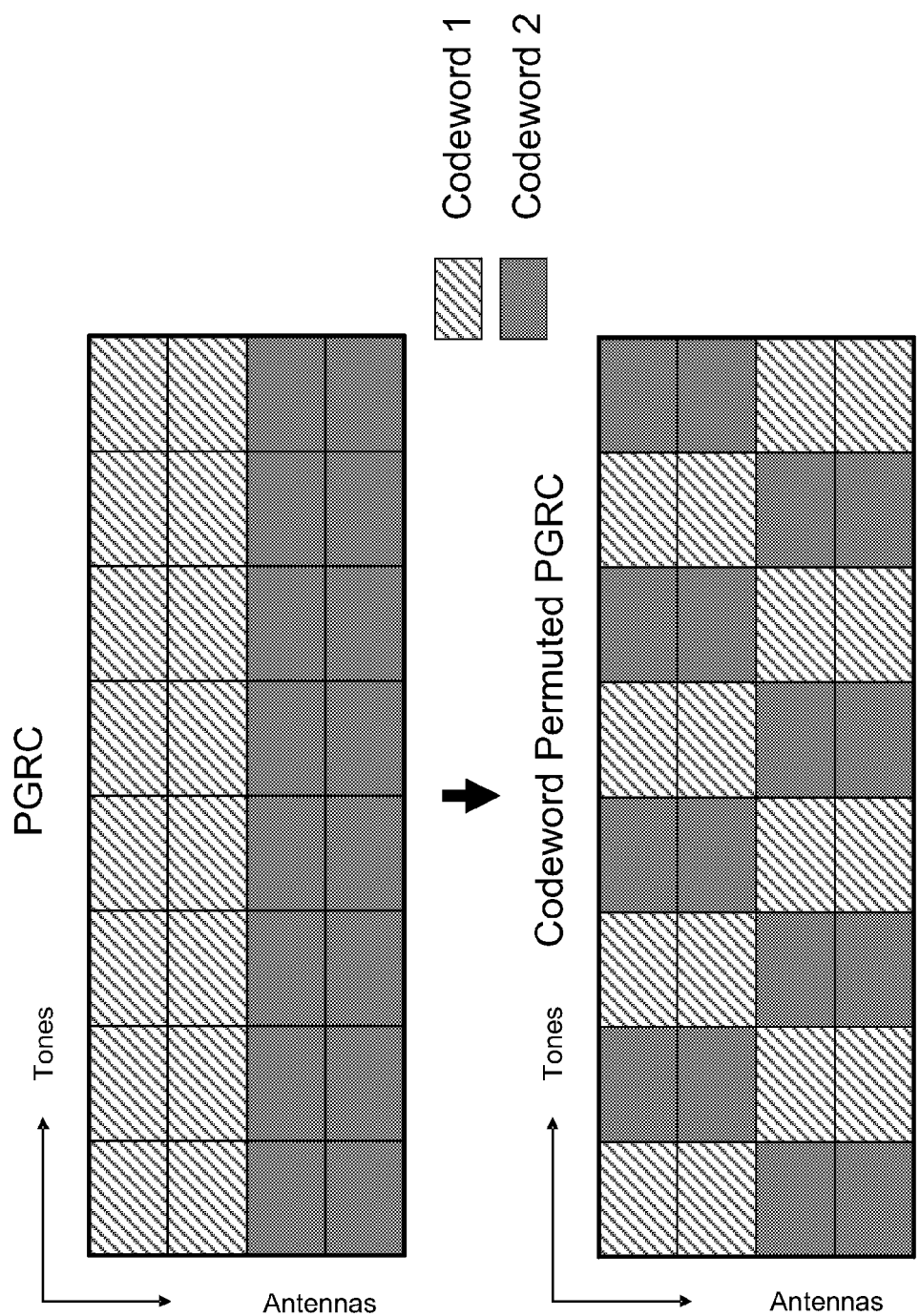

Turning to FIG. 5a, a permutation scheme is depicted. In a traditional PGRC scheme, codeword 1 is transmitted over the antenna group comprising antennas 1 and 2. Codeword 2 is, thus, transmitted over the antenna group of antennas 3 and 4. It is to be appreciated that in the symmetrical reflection, codeword 1 is transmitted over antennas 3 and 4 and codeword 2 over antennas 1 and 2. In the PGRC with codeword permutation, both codeword 1 and codeword 2 are transmitted over both antenna groupings as shown.

Referring to FIG. 5b, illustrated is another possible permutation scheme. Antennas 1 and 3 transmit codeword 1 and antennas 2 and 4 transmit codeword 2 under the original PGRC groupings. In the symmetrical grouping, codeword 1 transmits over antennas 2 and 4 and codeword 2 transmits over antennas 1 and 3. Following codeword permutation, each codeword transmit overall four antennas. In particular, successive blocks of each codeword transmit over alternate groups. For example, in FIG. 5b, the first blocks of codeword 1 transmit over antennas 1 and 3 and the next blocks transmit over antennas 2 and 4.

Figure 5C:
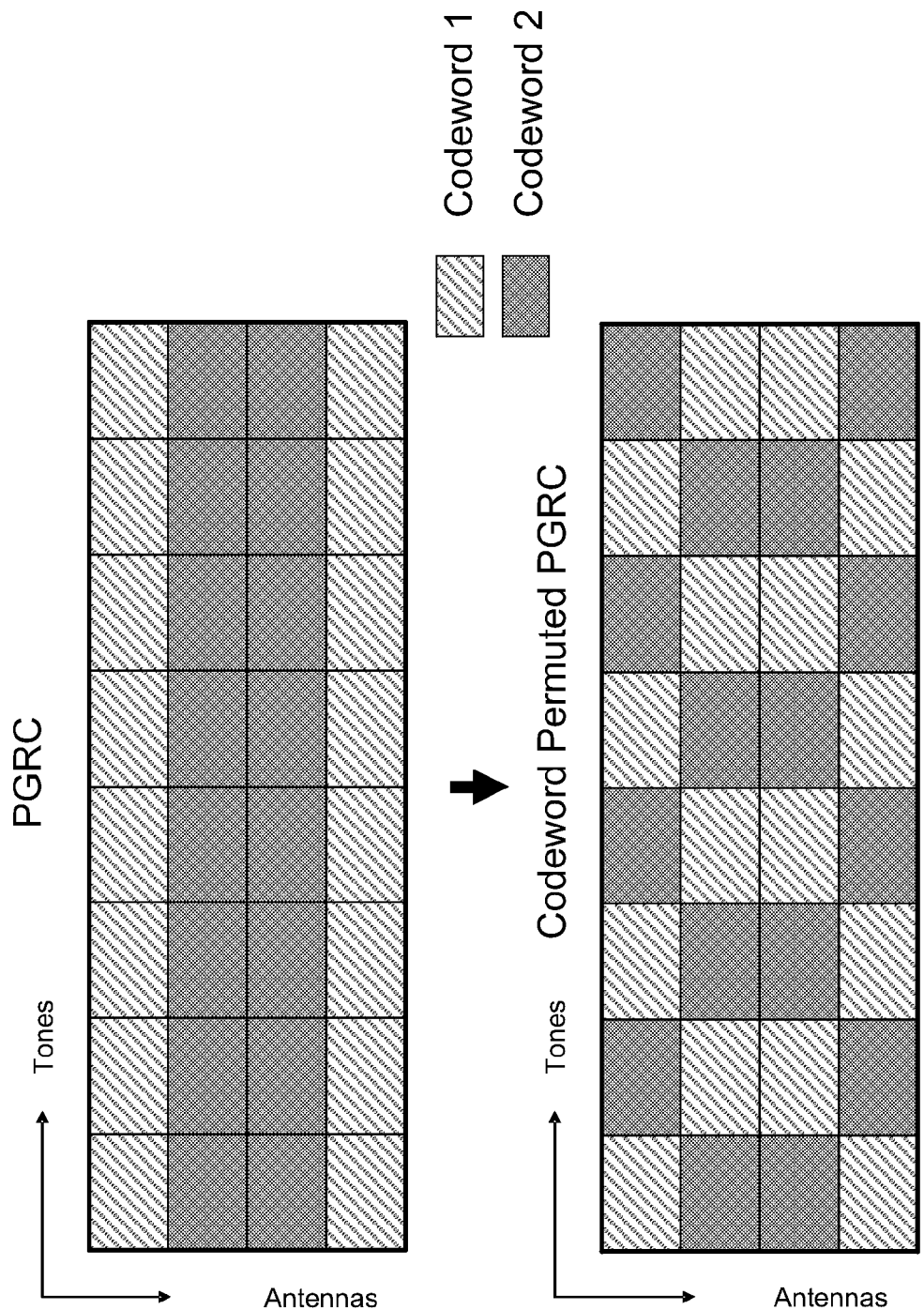

Turning now to FIG. 5c, another permutation scheme is illustrated. In the original PGRC, codeword 1 is transmitted over antennas 1 and 4 and codeword 2 is transmitted over antennas 2 and 3. Following codeword permutation, codewords 1 and 2 are transmitted over all four antennas as depicted.

Figure 5D:
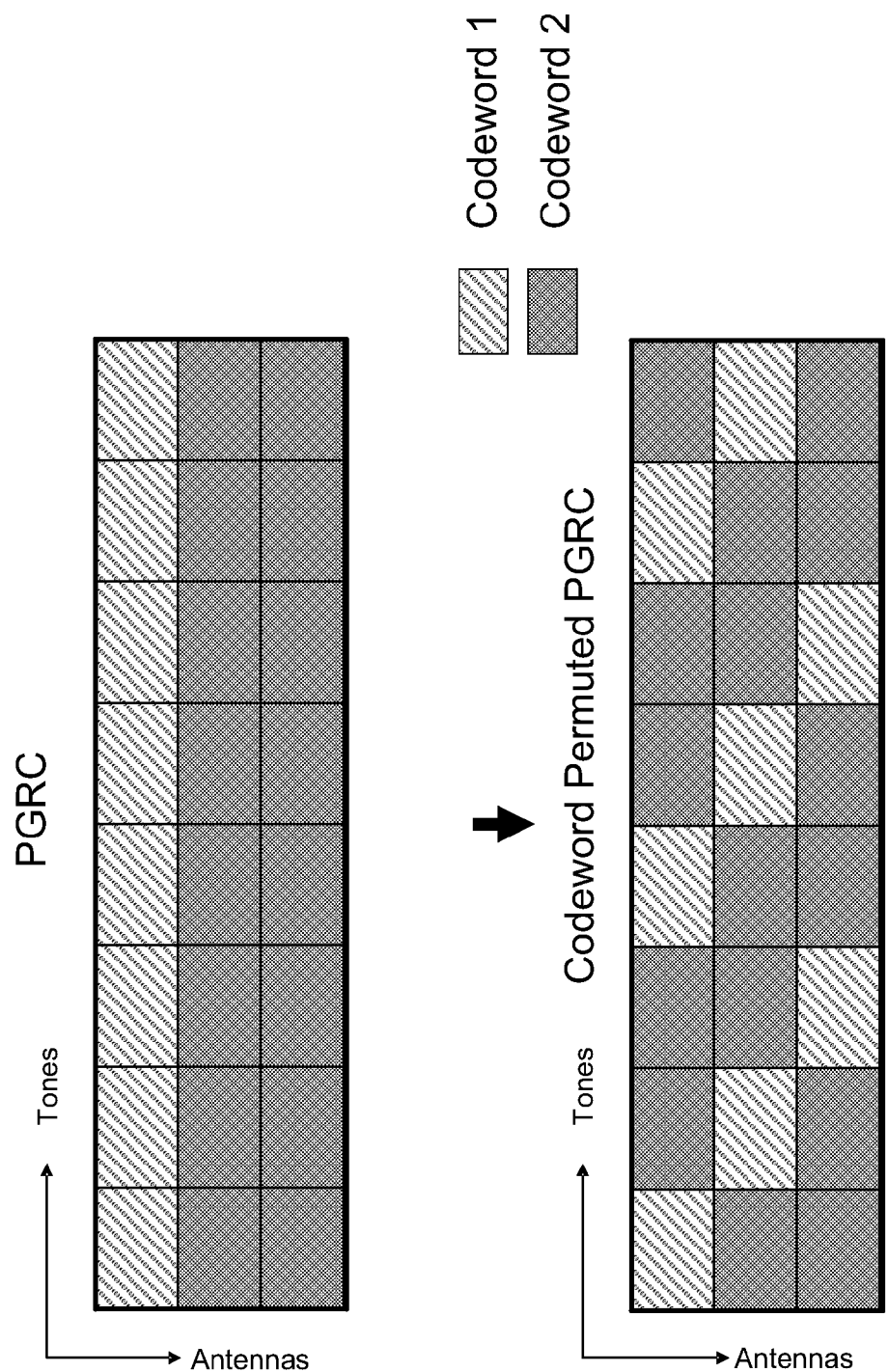

Referring now to FIG. 5d, yet another permutation scheme is illustrated. In this example, there are three active antennas and two codewords. Codeword 1 corresponds to only one layer while codeword 2 corresponds to two layers. In the original PGRC, codeword 1 is transmitted over antenna 1 and codeword 2 is transmitted over antennas 2 and 3. Following codeword permutation, codewords 1 and 2 are transmitted over all three active antennas. While FIG. 5d depicts a cycling permutation pattern, the disclosed subject matter is not so limited. For example, the codewords can be permuted according to a pseudo-random pattern. Additionally, codeword 2 may undergo intra-codeword permutation as described infra.

Figure 5E:
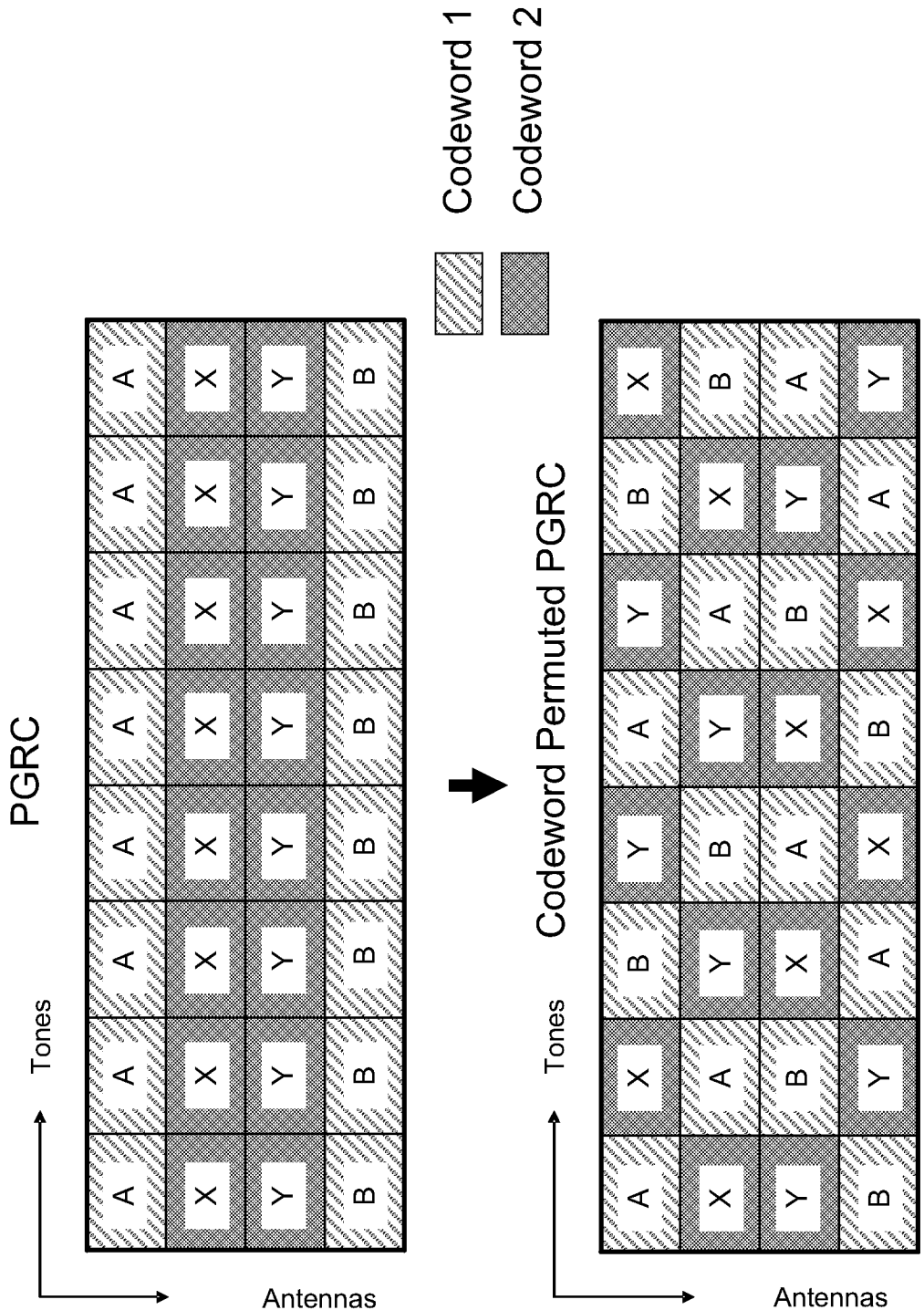

Turning now to FIG. 5e, another example permutation scheme is illustrated depicting inter-codeword permutation and intra-codeword permutation. Inter-codeword permutation is the permutation of codewords across antenna groups. Intra-codeword permutation relates to permuting a codeword within an antenna group. For example, FIG. 5e depicts an inter-codeword permutation scheme similar to that depicted in FIG. 5c with the addition of labels indicating the respective portions of the codewords. In the original PGRC, the portion of codeword 1 labeled A is transmitted over antenna 1 and the portion labeled B is transmitted over antenna 4. Similarly, the portion of codeword 2 labeled X is transmitted over antenna 2 and the portion labeled Y is transmitted over antenna 3. After permutation, the portion labeled A is not only transmitted over antennas 1 and 2 (or antennas 1 and 3) but, rather, transmits over all four antennas. The portions labeled B, X and Y are similarly permuted and transmitted. Thus, according to one aspect of the subject disclosure, intra-codeword permutation can occur along with inter-codeword permutation.

Figure 5F:
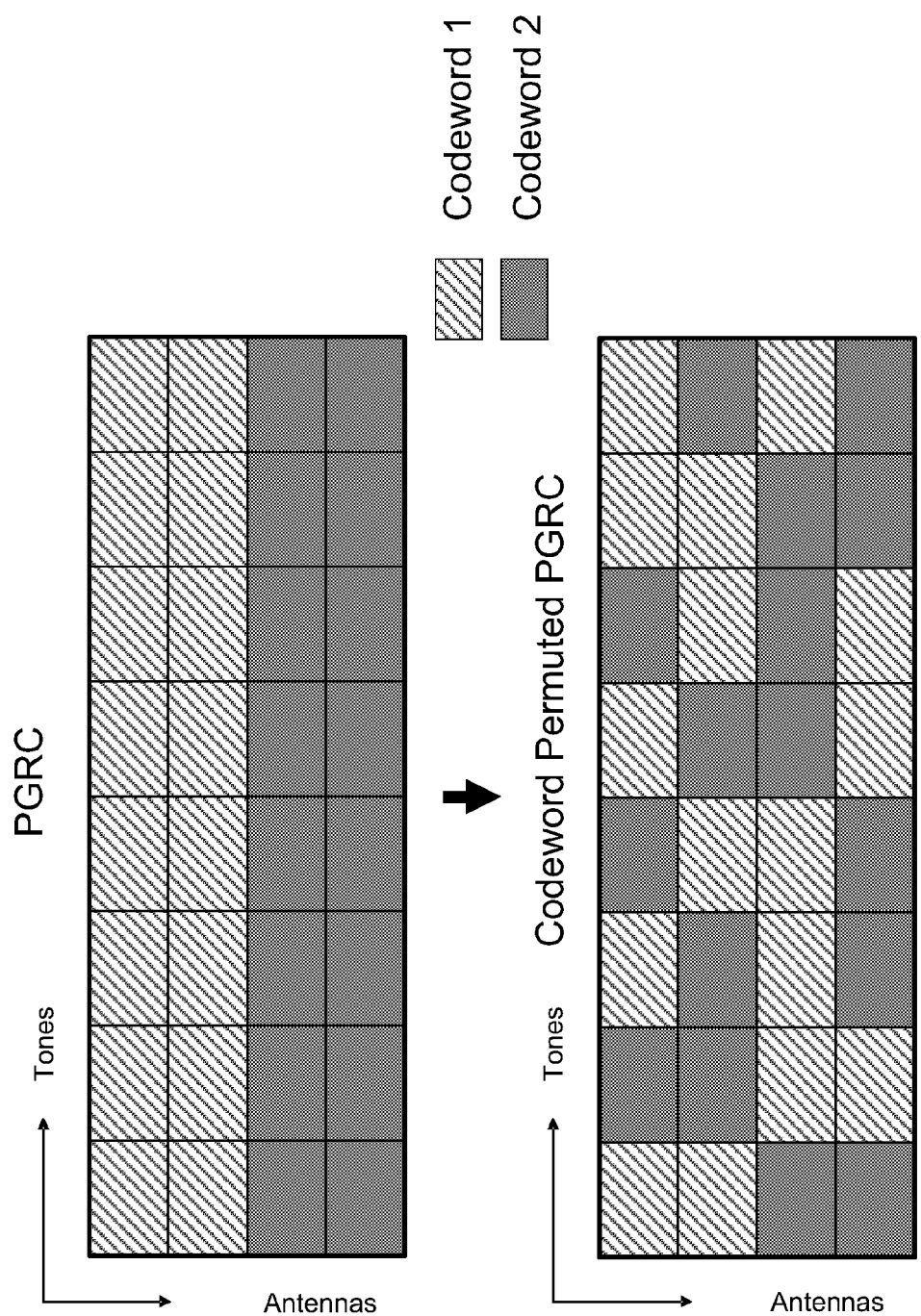

Referring now to FIG. 5f, another example permutation scheme is illustrated depicting codeword permutation without regard for original antenna groupings. In the original PGRC, codeword 1 and codeword 2 correspond to two layers. Codeword 1 is transmitted on antennas 1 and 2 and codeword 2' is transmitted on antennas 3 and 4. After permutation, codewords 1 and 2 are both transmitted over all four antennas based upon a cycling of all permutation patterns described supra with regard to FIGS. 5a-c. In accordance with an aspect of the subject disclosure, permutation is not limited to original antenna groupings. For example, the group comprising antennas 1 and 2 can transmit portions of both codewords concurrently as shown.

Figure 5G:
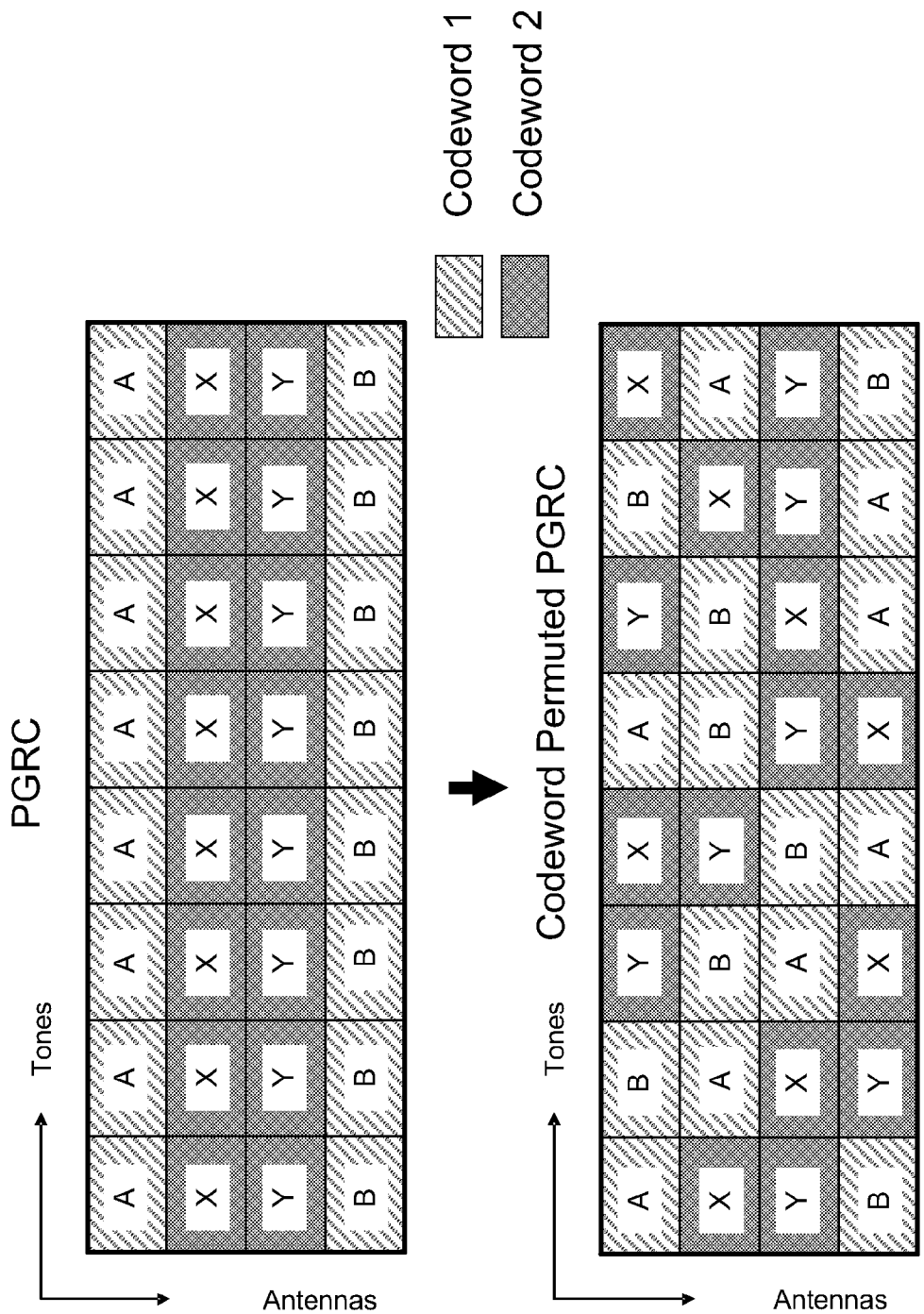

Turning now to FIG. 5g, yet another permutation scheme is illustrated. FIG. 5g depicts intra-codeword permutation as shown in FIG. 5e and permutation without regard to original antenna groupings as shown in FIG. 5f. In the original PGRC, the portion of codeword 1 labeled A is transmitted over antenna 1 and the portion labeled B is transmitted over antenna 4. Similarly, the portion of codeword 2 labeled X is transmitted over antenna 2 and the portion labeled Y is transmitted over antenna 3. After permutation, the portions labeled A, B, X, and Y are transmitted over all four antennas without regard to the original groupings. For example, if the portion labeled A can be transmitted on antenna 2, the portion labeled B is not restricted to antenna 3 (i.e., the second antenna in the original grouping). Thus, according to one aspect of the subject disclosure, full permutation can occur.

Figure 6:
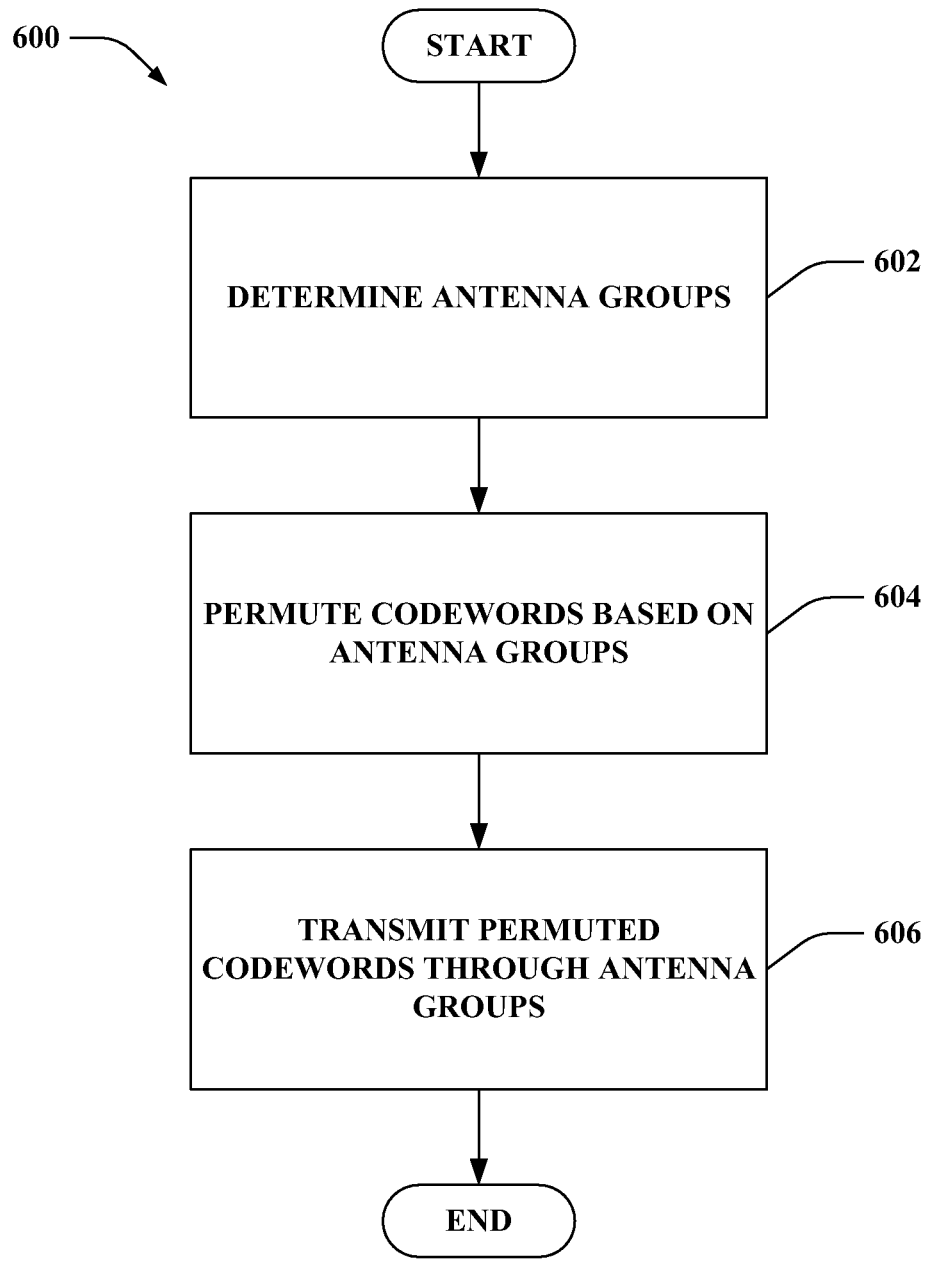
FIG. 6 is an illustration of an example methodology that facilitates reducing feedback for MIMO systems through permutation.
Figure 7:
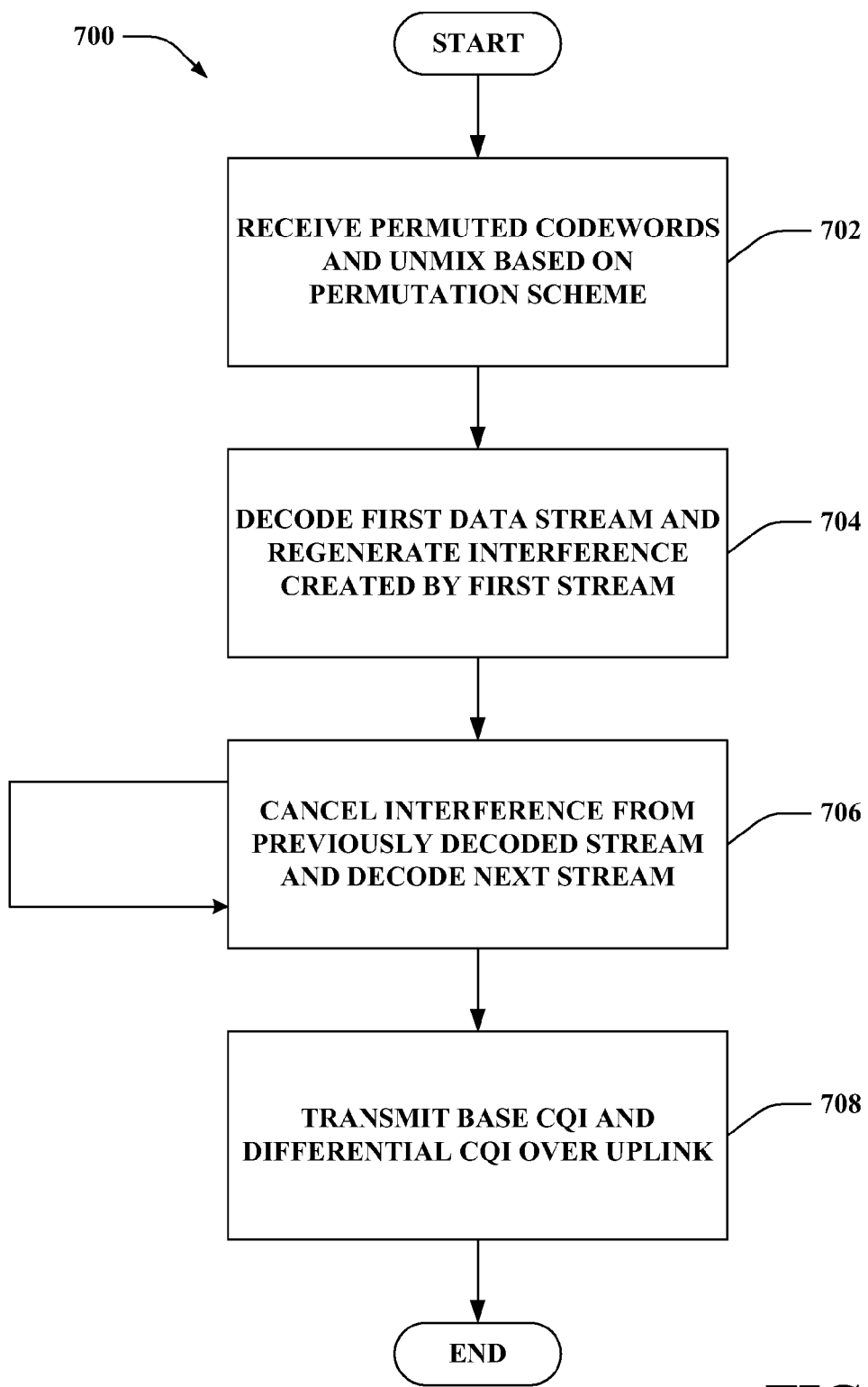
FIG. 7 is an illustration of an example methodology that generates feedback based upon permuted codeword transmissions.

Referring to FIGS. 6-7, methodologies relating to permuting codewords in multi-codeword MIMO systems are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 6, illustrated is a methodology 600 that facilitates reducing feedback for MIMO systems by permuted codewords prior to transmission. At 602, antenna groups are determined. An antenna group can include one or more physical or virtual antennas of the MIMO system. Antenna groups are determined based upon the MIMO configuration, the number of active antennas, the number of streams to be transmitted and the manner in which the data streams are encoded. For example, in a MIMO configuration with four active antennas and two streams, two groups of two antennas each can be employed. At 604, codewords are permuted over the antenna groups. Blocks or portions of the codewords are mixed based upon the combinations or permutations of the antenna groups. The number of comminations depends upon the size of the groups and the MIMO configuration. For example, a 4×4 MIMO configuration with antenna groups comprising two antennas each has 2 antenna groups and, accordingly, two permutations or combinations. At 606, the permuted codewords are transmitted via the antenna groups such that each codeword, in part, is transmitted over all antennas.

Now referring to FIG. 7, illustrated is a methodology 700 that provides feedback based upon permuted codewords transmitted in a MIMO environment. At 702, permuted codewords are received via a forward link channel or downlink (e.g., in a MIMO system) and the codewords blocks are unmixed based upon the scheme employed to permute them prior to transmission. At 704, the data stream corresponding to a first codeword is decoded and reconstructed. Further, the interference created by the first stream during transmission is regenerated. At 706, a next data stream corresponding to a next codeword is decoded and reconstructed. During decoding, the regenerated interference from the first decoded stream is cancelled and the SINR value improves. If there are additional data streams and codewords, the interference created during transmission of the newly decoded stream is regenerated to be utilized in the same manner with regard to later decoded streams. Reference numeral 706 is repeated until all data streams have been decoded and reconstructed. At 708, feedback is provided on the uplink so that data rate adjustments can be made to improve performance of subsequent data transmissions. The feedback comprises a base channel quality indicator (CQI) reflecting the effective or average SINR value of the first decoded codeword and a differential CQI reflecting the increase in SINR obtained by cancelling the interference of the first or previously decoded codewords.

It will be appreciated that, in accordance with one or more aspects described herein, inferences can be made regarding identifying active antennas, determining codeword to layer correspondence, providing channel related feedback, utilizing channel related feedback, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting a manner by which to group transmit antennas (e.g., selecting groupings based upon the codeword to layer correspondence and active antennas). By way of further illustration, an inference may be made related to selecting whether to permute codewords in circumstances wherein benefits may or may not be obtained. It will be appreciated that the foregoing examples are illustrative in nature and are not intended to limit the number of inferences that can be made or the manner in which such inferences are made in conjunction with the various embodiments and/or methods described herein.

Figure 8:
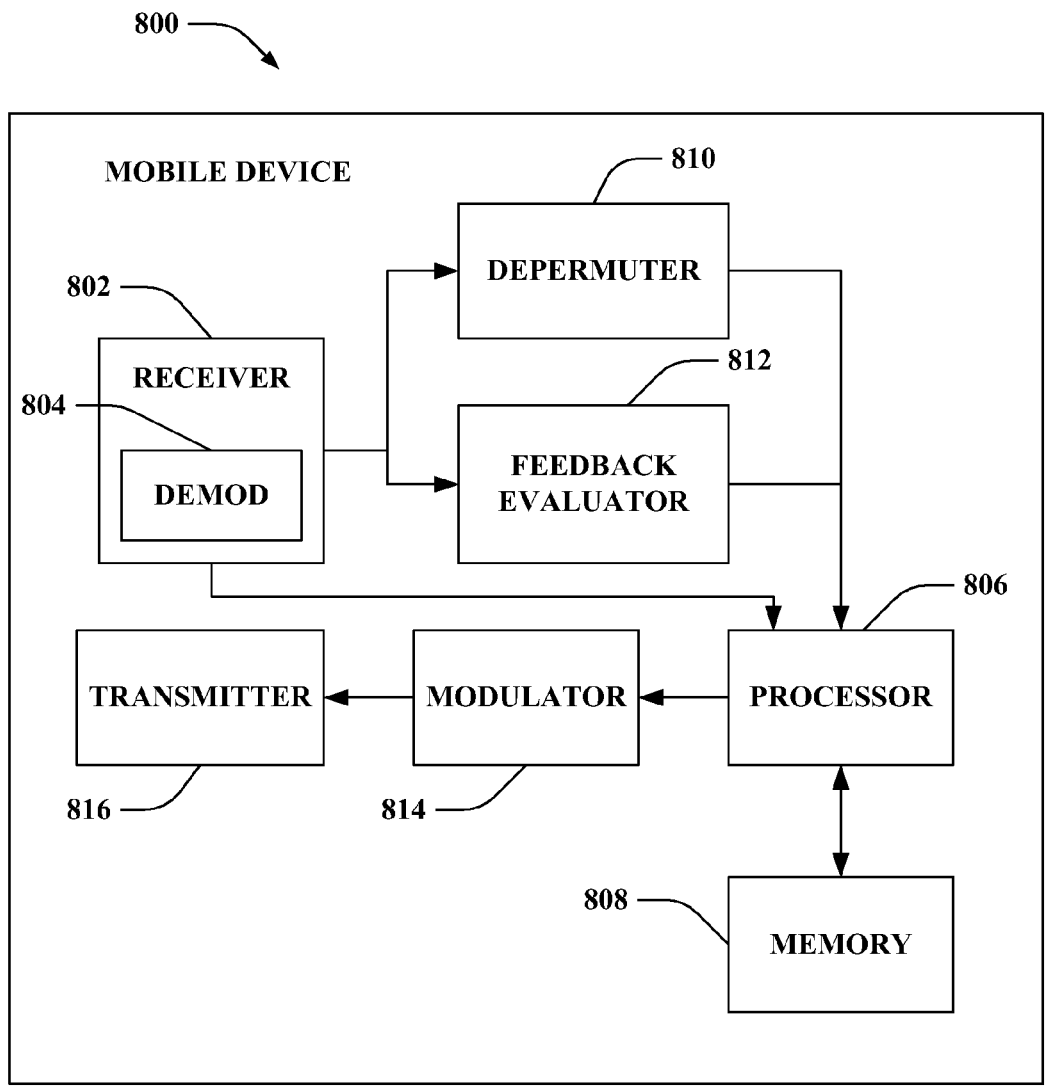
FIG. 8 is an illustration of an example mobile device that facilitates reducing feedback by utilizing codeword permutation in a MIMO system employing a per group rate control scheme.

FIG. 8 is an illustration of a mobile device 800 that facilitates reducing feedback by utilizing codeword permutation in a MIMO system employing a Per Group Rate Control (PGRC) scheme. Mobile device 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that may store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to a depermuter 810 that unmixes the codewords transmitted over the forward link channel or downlink channel by a base station to mobile device 800. The codewords are permuted prior to transmission to increase the spatial diversity of each codeword and reduce the amount of feedback required to adjust the channels for increased performance. Since all the codewords are transmitted over all the antennas of the MIMO system, the codewords experience essentially the same conditions. The SNR or SINR values of the codewords will be well-behaved and closely related. Additionally, a feedback evaluator 812 may utilize the unmixed codewords and decoded data streams retained in memory 808 of mobile device 800 to determine a condensed feedback form to transmit over a reverse link channel or uplink channel to a base station. For example, the feedback evaluator 812 may perform successive interference cancellation on the codewords. Feedback evaluator 812 can regenerate the interference created by a first decoded data stream or codeword and employ the regenerated interference to cancel actual interference while decoding subsequent data stream or codewords. The cancellation increases the SNR or SINR value of the subsequent codeword. The feedback evaluator 812 determines a CQI base value indicated by the effective or average SINR value of the first decoded data stream and a CQI differential suggested by the SINR gain of the second codeword obtained by cancelling the interference of the first codeword. Alternatively, the CQI base value and the CQI differential can be derived by using the MIMO channel estimates obtained via reference signals (e.g., pilot signals), assuming certain cancellation statistics (e.g., no cancellation for the CQI base value and perfect cancellation for the CQI differential). Mobile device 800 still further comprises a modulator 814 and a transmitter 816 that transmits a signal (e.g., base CQI and differential CQI) to, for instance, a base station, another mobile device, etc. Although depicted as being separate from the processor 806, it is to be appreciated that depermuter 810, feedback evaluator 812 and/or modulator 814 may be part of processor 806 or a number of processors (not shown).

Figure 9:
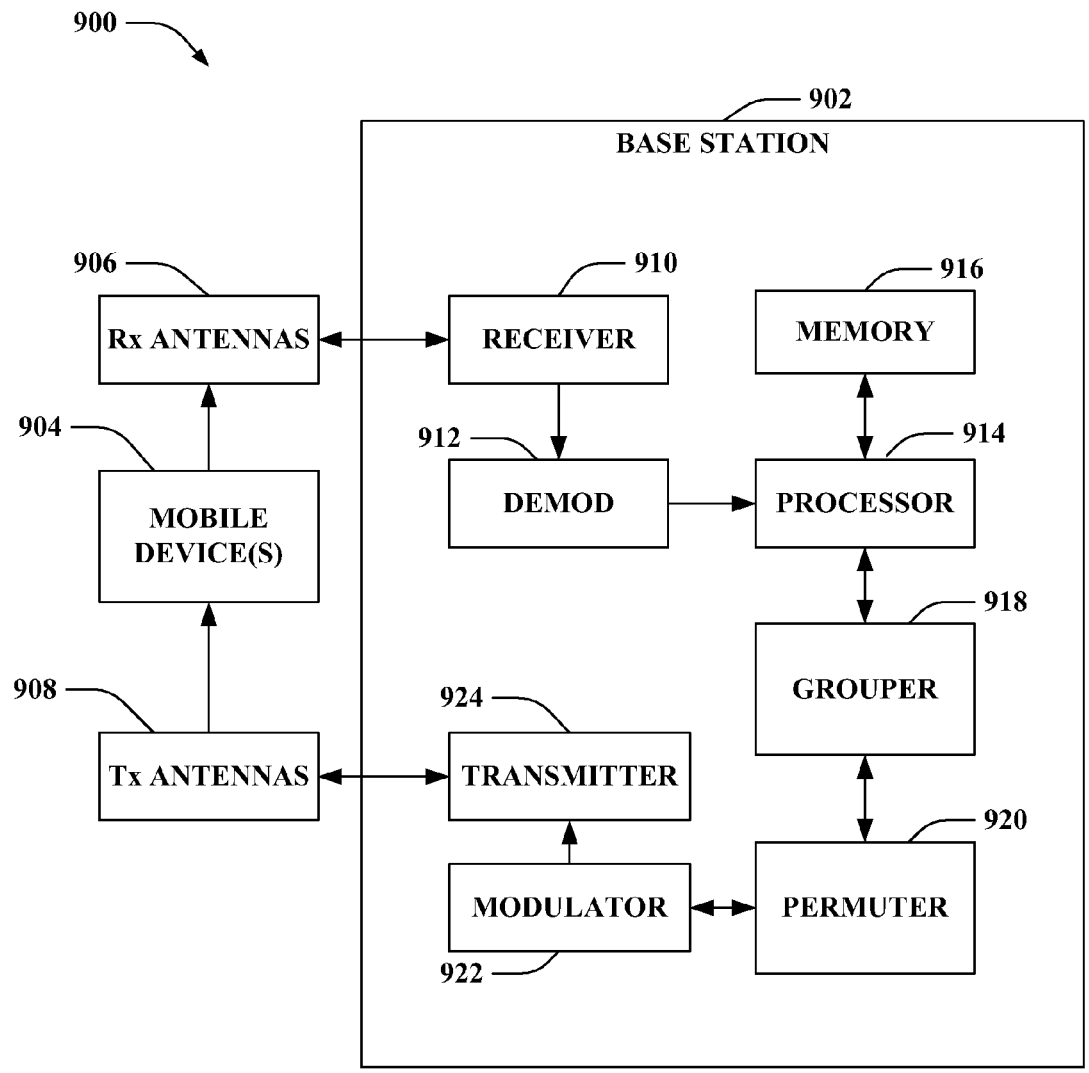
FIG. 9 is an illustration of an example system that facilitates reducing the amount of feedback required to control transmissions in a MIMO environment based upon codeword permutation.

FIG. 9 is an illustration of a system 900 that facilitates reducing the amount of feedback required to control forward link transmission in a MIMO system implementing a PGRC scheme. System 900 comprises a base station 902 (e.g., access point, . . . ) with a receiver 910 that receives signal(s) from one or more mobile devices 904 through a plurality of receive antennas 906, and a transmitter 922 that transmits to the one or more mobile devices 904 through a plurality of transmit antennas 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein. Processor 914 is further coupled to a grouper 918 that determines groupings of transmit antennas 908 to utilize for data transmission in accordance with a PGRC scheme. Grouper 918 establishes groups based upon a number of active antennas and a layer-to-codeword ratio. For example, grouper 918 may group antennas in sets of two antennas each with one data stream or codeword to be transmitted on each set.

Grouper 918 may be further coupled to a permuter 920 that mixes codewords across all antenna groupings based upon the initial group designations. For example, if a first codeword is assigned to a first antenna group and a second codeword is assigned to a second group, permuter 920 mixes codewords blocks of the first and second codewords between both antenna groups. Encoding data streams relative to a group of antennas reduces the complexity of base station 902. Separate MCS systems are not necessary for each antenna included in the MIMO system's transmit antennas 908 as would be required in a (S)PARC scheme. For example, if base station 902 has 4 antennas, it requires 4 MCS systems in a (S)PARC scheme but can eliminate at least 2 MCS systems by employing a PGRC scheme. Further, the amount of feedback required to control subsequent transmission is also reduced. Information utilized to control subsequent transmissions may be provided to a modulator 922. For example, modulator receives the base CQI and differential CQI evaluated by mobile device 802 from FIG. 8. Modulator 922 can multiplex the control information for transmission by a transmitter 926 through antenna 908 to mobile device(s) 904. Although depicted as being separate from the processor 914, it is to be appreciated that group circuit 918, permuter 920 and/or modulator 922 may be part of processor 914 or a number of processors (not shown).

Figure 10:
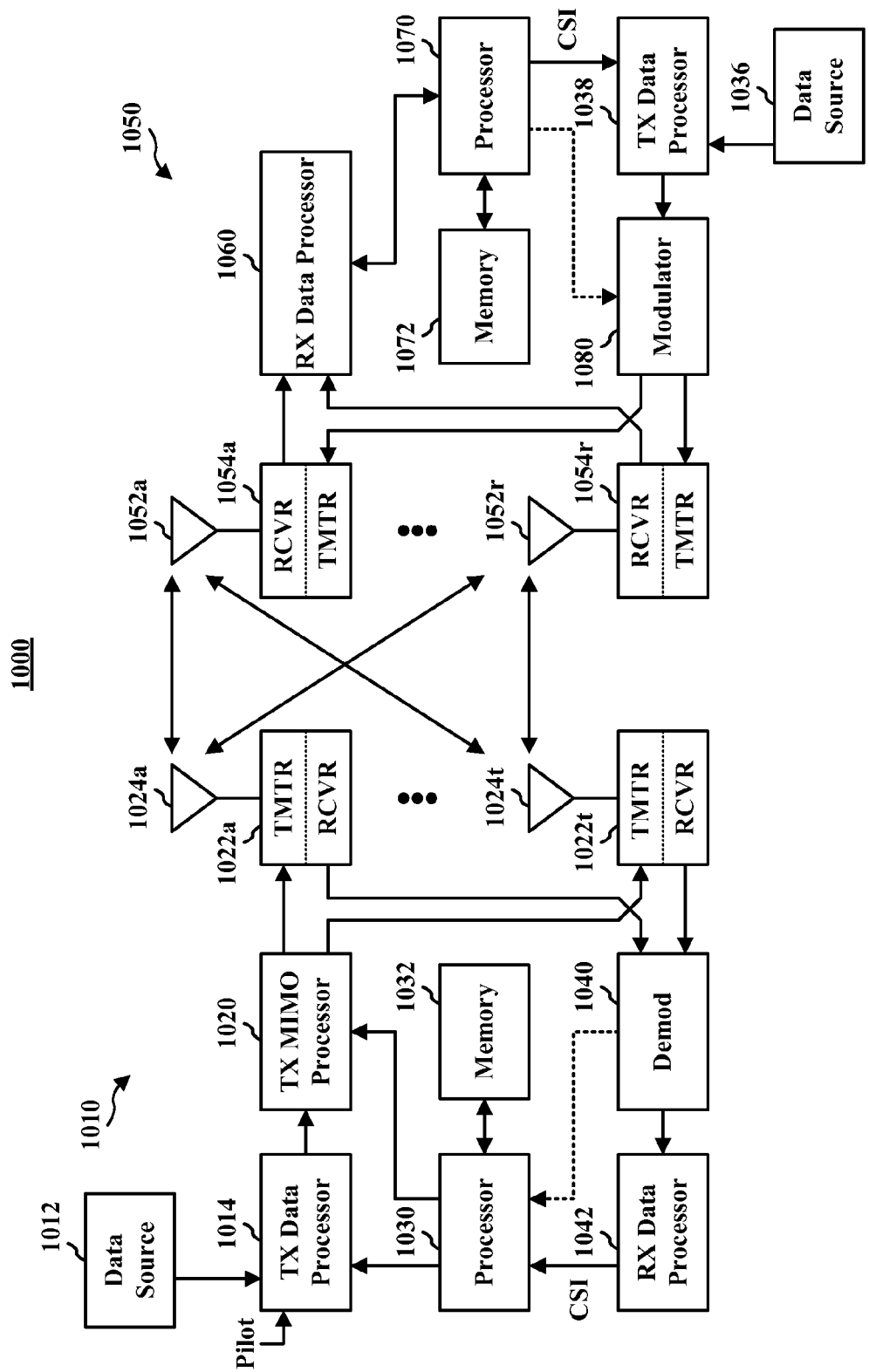
FIG. 10 is an illustration of an example wireless network environment that can be employed in conjunction with the various systems and methods described herein.

FIG. 10 shows an example wireless communication system 11000. The wireless communication system 1000 depicts one base station 1010 and one mobile device 1050 for sake of brevity. However, it is to be appreciated that system 11000 may include more than one base station and/or more than one mobile device, wherein additional base stations and/or mobile devices may be substantially similar or different from example base station 1010 and mobile device 1050 described below. In addition, it is to be appreciated that base station 1010 and/or mobile device 1050 may employ the systems (FIGS. 1-4 and 8-9) and/or methods (FIGS. 6-7) described herein to facilitate wireless communication there between.

At base station 1010, traffic data for a number of data streams is provided from a data source 1012 to a transmit (TX) data processor 1014. According to an example, each data stream may be transmitted over a respective antenna. TX data processor 1014 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and may be used at mobile device 1050 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 1030.

The modulation symbols for the data streams may be provided to a TX MIMO processor 1020, which may further process the modulation symbols (e.g. for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 may receive and process the $N_R$ received symbol streams from $N_R$ receivers 1054 based on a particular receiver processing technique to provide $N_T$ "detected" symbol streams. RX data processor 1060 may demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 may periodically determine which precoding matrix to utilize as discussed above. Further; processor 1070 may formulate a reverse link message comprising a matrix index portion and a rank value portion.

The reverse link message may comprise various types of information regarding the communication link and/or the received data stream. The reverse link message may be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 may process the extracted message to determine which precoding matrix to use for determining the beamforming weights.

Processors 1030 and 1070 may direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 11:
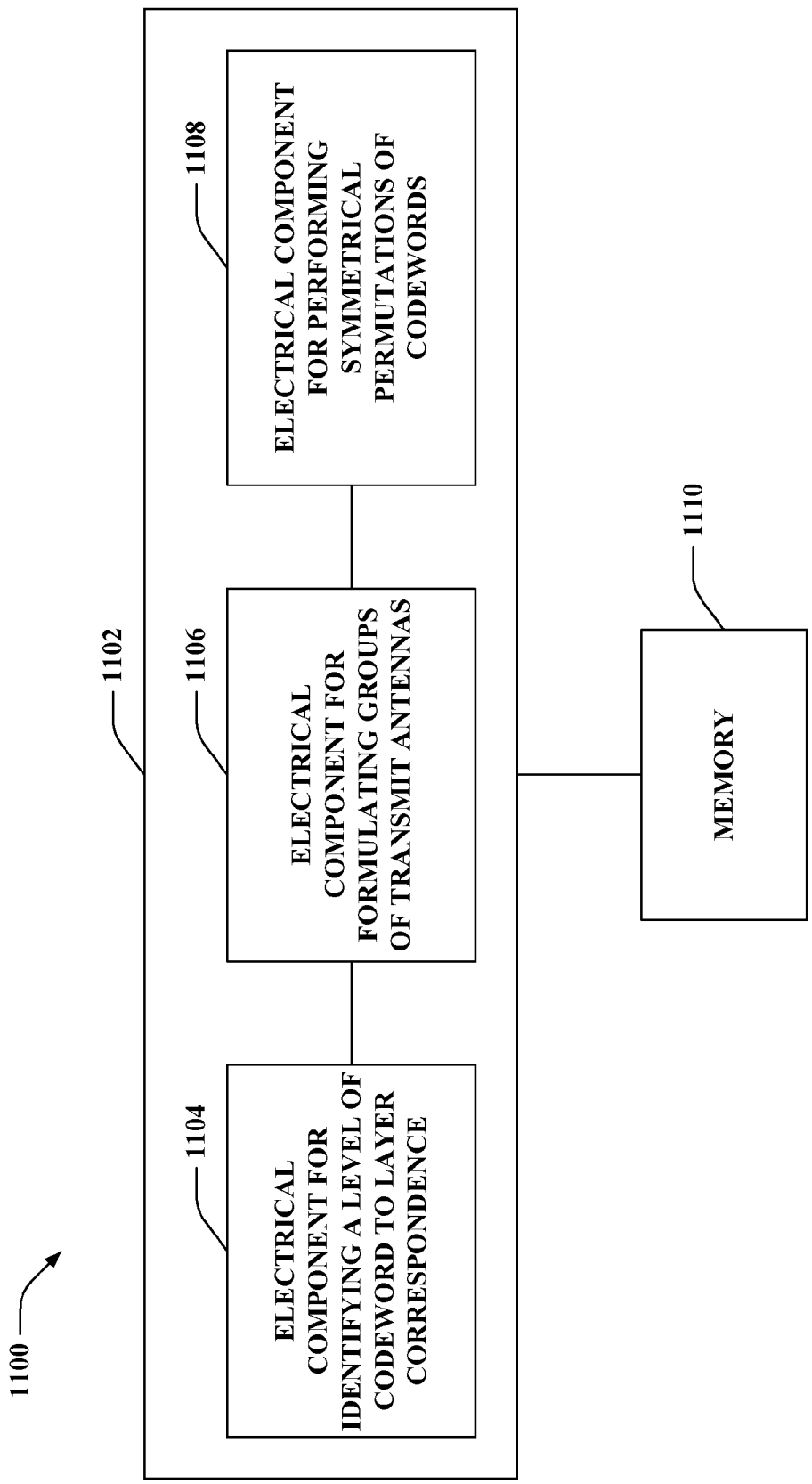
FIG. 11 is an illustration of an example system that facilitates reducing feedback by transmitting codewords in a permuted form.

With reference to FIG. 11, illustrated is a system 1100 that facilitates reducing required feedback on a reverse link channel of a MIMO system by transmitting codewords in a PGRC scheme through all active antennas. For example, system 11100 may reside at least partially within a base station. It is to be appreciated that system 1100 is represented as including functional blocks, which may be functional blocks that represent functions implemented by a processor, software, or combination thereof (e.g., firmware). System 1100 includes a logical grouping 1102 of electrical components that can act in conjunction. For instance, logical grouping 1102 may include an electrical component for identifying a level of codeword to layer correspondence 1104. For example, in a MIMO environment implementing a per group rate control scheme, a codeword can correspond to two layers (e.g., physical antennas, virtual antennas, etc.). It is to be appreciated that a codeword can correspond to any number of layers. Further, logical grouping 1102 may comprise an electrical component for formulating groups of transmit antennas 1106. Groups are determined at least in part on the level of codeword to layer correspondence. For example, when each codeword corresponds to two layers, then groups of two transmit antennas each are formulated. Moreover, logical grouping 1102 may include an electrical component for performing symmetrical permutations of codewords 1108. According to an example wherein a codeword is associated with two layers, groups of two antennas each can be utilized. Traditionally, each group transmits one codeword. After a symmetrical permutation, each codeword is mixed between all antenna groups such that each group transmits, in part, every codeword. Further, transmission of codewords in permuted form enables every codeword to experience substantially similar channel conditions. This results in well behaved channel quality values which vary little codeword to codeword. Additionally, system 1100 may include a memory 1110 that retains instructions for executing functions associated with electrical components 1104, 1106, and 1108. While shown as being external to memory 1110, it is to be understood that one or more of electrical components 1104, 1106, and 1108 may exist within memory 1110.

Figure 12:
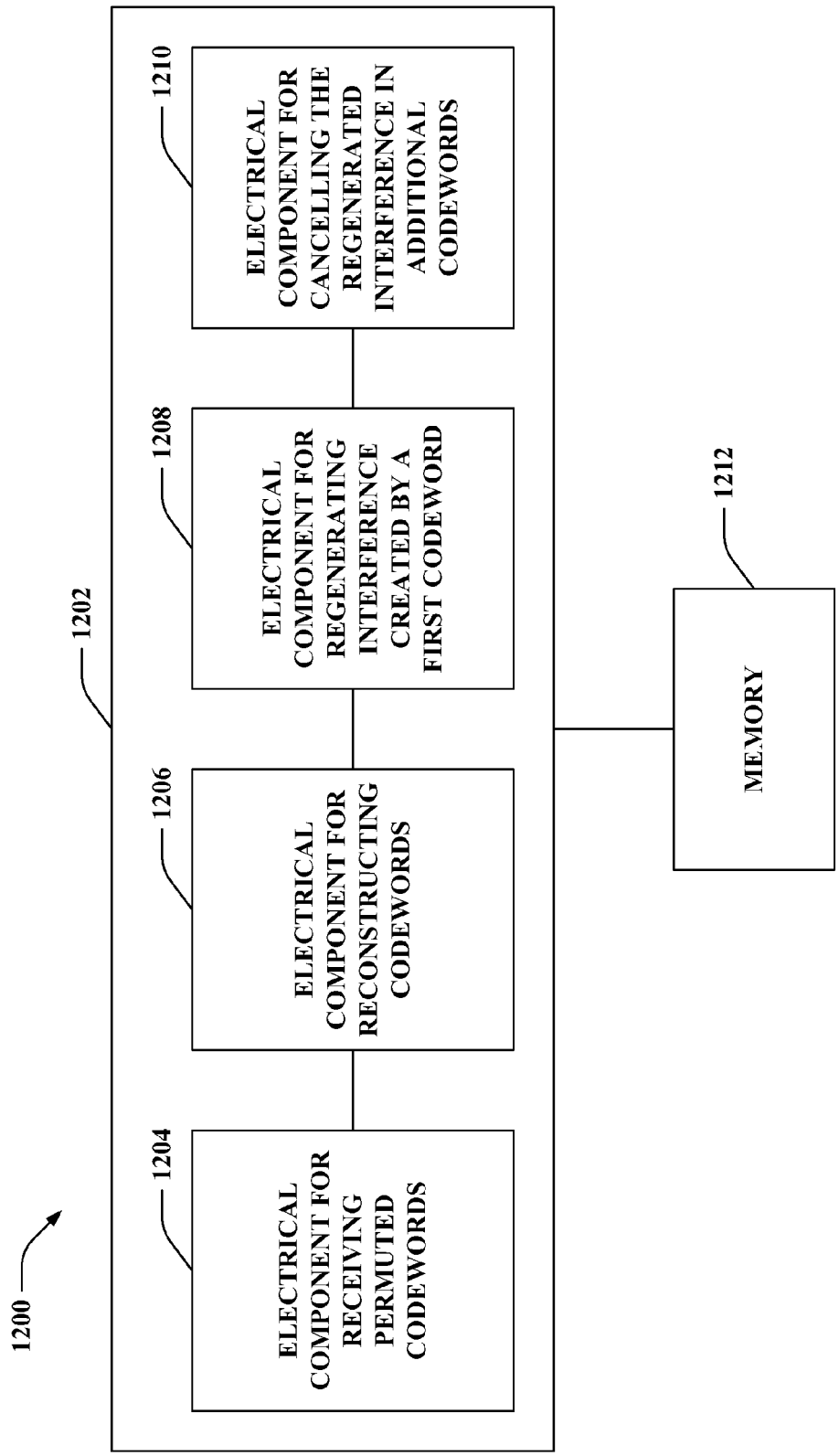
FIG. 12 is an illustration of an example system that calculates reduced feedback based upon permuted codewords.

Turning to FIG. 12, illustrated is a system 1200 that calculates reduced feedback by employing successive interference operations on permuted codewords. System 1200 may reside within a mobile device, for instance. As depicted, system 1200 includes functional blocks that may represent functions implemented by a processor, software, or combination thereof (e.g., firmware). System 1200 includes a logical grouping 1202 of electrical components that facilitate controlling forward link transmission. Logical grouping 1202 may include an electrical component for receiving permuted codewords 1204. For example, a receiver is included in a MIMO system with multiple receiver antennas and each permuted codeword is received by all receive antennas. Moreover, logical grouping 1202 may include an electrical component for reconstructing received codewords 1206. According to an example, the codewords are received in permuted form. The codewords are unmixed and reconstructed. It is to be appreciated that the permutation scheme employed during transmission is known so that the codewords can be depermuted. Further, logical grouping 1202 may comprise an electrical component for regenerating interference created by a first codeword 1208. After, reconstructing the codewords and decoding a first codeword, the interference created by the first decoded codeword is regenerated. Also, logical grouping 1202 may include an electrical component for cancelling the regenerated interference in additional codewords 1210. For example, the regenerated interference is subtracted while decoding a second codeword to improve signal and channel quality. Additionally, system 1200 may include a memory 1212 that retains instructions for executing functions associated with electrical components 1204, 1206, 1208, and 1210. While shown as being external to memory 1212, it is to be understood that electrical components 1204, 1206, 1208, and 1210 may exist within memory 1212.

What has been described above includes examples of one or more embodiments. It is, of course, not possible to, describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates reducing required feedback for data rate control in wireless communication, comprising:
   determining one or more groupings of a plurality of transmit antennas;
   permuting data stream codewords according to a permutation of the one or more groupings of the transmit antennas;
   transmitting the permuted codewords through the one or more groupings of the transmit antennas over a forward link channel; and
   receiving a condensed channel quality indicator (CQI) as feedback related to transmitting the permuted codewords, wherein the condensed CQI comprises a base CQI reflecting a signal quality metric of both a first decoded codeword and a second decoded codeword,
   wherein determining the one or more groupings comprises identifying active antennas among the plurality of transmit antennas and disregarding inactive antennas when formulating the one or more groupings.

2. The method of claim 1, further comprising:
   determining a layer to codeword ratio; and
   restricting a size of the one or more groupings to the layer to codeword ratio.

3. The method of claim 2, wherein each codeword corresponds to one layer.

4. The method of claim 2, wherein each codeword corresponds to two layers.

5. The method of claim 1, further comprising:
   adjusting at least one of a data rate, code rate, or modulation scheme of subsequent codewords transmitted based upon the condensed CQI.

6. The method of claim 5, wherein the condensed CQI comprises the base CQI reflecting the signal quality metric of the first decoded codeword and a differential CQI reflecting a signal quality gain obtained by cancelling the first decoded codeword in decoding a second codeword.

7. The method of claim 6, wherein the signal quality metric is one of a signal-to-noise ratio (SNR) or signal-to-interference-plus-noise ratio (SINR).

8. The method of claim 6, wherein adjusting subsequent codewords comprises:
   adjusting the at least one of a data rate, code rate, or modulation scheme of a subsequent codeword according to the base CQI; and
   adjusting the at least one of a data rate, code rate, or modulation scheme of additional subsequent codewords based upon a sum of the base CQI and a multiple of the differential CQI.

9. The method of claim 1, wherein the plurality of transmit antennas include one or more physical or virtual antennas.

10. The method of claim 1, wherein adjusting subsequent codewords comprises:
    adjusting the at least one of a data rate, code rate, or modulation scheme of subsequent codewords based upon the base CQI.

11. The method of claim 1, wherein permuting codewords comprises distributing codeword blocks amongst all antenna groups such that each codeword is transmitted in part over each antenna in the plurality of antennas.

12. A wireless communications apparatus employable in a multiple-input, multiple-output system, comprising:
    means for identifying a level of codeword to layer correspondence;
    means for formulating groups of transmit antennas based at least in part on the level of codeword to layer correspondence, wherein the means for formulating groups comprises means for identifying active antennas and means for disregarding inactive antennas;
    means for performing symmetrical permutations of at least two codewords;
    means for transmitting the at least two permuted codewords through the formulated antenna groups; and
    means for utilizing feedback related to the transmission of the at least two permuted codewords, wherein the feedback comprises a condensed channel quality indicator (CQI) that comprises base CQI reflecting a signal quality metric of both a first decoded codeword and a second decoded codeword,
    wherein the condensed CQI comprises the base CQI reflecting the signal quality metric of the first decoded codeword and a differential CQI reflecting a signal quality gain obtained by cancelling the first decoded codeword in decoding a second codeword.

13. A wireless communications apparatus, comprising:
a memory that retains instructions related to grouping transmit antennas, permuting codeword symbols based upon the antenna groupings, and utilizing feedback to adjust transmission performance, wherein the feedback comprises a condensed channel quality indicator (CQI) related to transmitting the permuted codeword symbols that comprises a base CQI reflecting a signal quality metric of both a first decoded codeword symbol and a second decoded codeword symbol; and
a processor, coupled to the memory, configured to execute the instructions retained in the memory,
wherein the memory further retains instructions related to determining a number of active antennas and identifying a level of codeword to layer correspondence.

14. A non-transitory machine-readable medium having stored thereon machine-executable instructions for:
grouping transmit antennas based upon a correspondence between codewords and layers;
shuffling codeword blocks across antenna groupings based upon symmetrical permutations of the groupings;
transmitting the shuffled codeword blocks via a forward link channel through the transmit antennas;
receiving a condensed feedback metric relating to the transmission of the shuffled codeword blocks, wherein the condensed feedback metric comprises a condensed channel quality indicator (CQI) that comprises a base CQI reflecting a signal quality metric of both a first decoded codeword and a second decoded codeword; and
adjusting subsequent transmissions based at least in part on the received feedback,
wherein grouping the transmit antennas comprises identifying active antennas and disregarding inactive antennas.

15. The machine-readable medium of claim 14, wherein the correspondence specifies for each transmission rank a number of layers associated with each codeword.

16. The machine-readable medium of claim 15, wherein at least one layer is associated with a codeword.

17. The machine-readable medium of claim 15, wherein at least two layers are associated with a codeword.

18. The machine-readable medium of claim 14, wherein the condensed feedback metric comprises the base CQI reflecting the signal quality metric of the first decoded codeword and a differential CQI reflecting a signal quality gain obtained by cancelling interference of the first decoded codeword in decoding a second codeword.

19. The machine-readable medium of claim 18, wherein adjusting subsequent transmissions comprises:
altering at least one of a data rate, code rate or modulation scheme of a subsequent codeword in response to the base CQI; and
altering at least one of a data rate, code rate or modulation scheme of additional subsequent codewords based upon a sum of the base CQI and a multiple of the differential CQI.

20. The machine-readable medium of claim 18, wherein adjusting subsequent transmission comprises adjusting the at least one of a data rate, code rate or modulation scheme of a subsequent codeword and additional subsequent codewords based upon the base CQI.

21. The machine-readable medium of claim 18, wherein the signal quality metric is one of a signal-to-noise ratio (SNR) or signal-to-interference-plus-noise ratio (SINR).

22. The machine-readable medium of claim 14, wherein a size of an antenna group is determined from the correspondence between codewords and layers.

23. The machine-readable medium of claim 14, wherein the transmit antennas include one or more physical or virtual antennas.

24. A method that generates reduced feedback in a wireless communication system, comprising:
unmixing permuted codeword blocks according to a permutation scheme employed during transmission;
evaluating a condensed channel quality indicator (CQI) related to the permuted codeword blocks, wherein the condensed CQI comprises a base CQI reflecting a signal quality metric of both a first decoded codeword and a second decoded codeword;
regenerating interference created by the first codeword during transmission; and
evaluating a differential CQI related to quality increase resulting from cancelling the regenerated interference in decoding the second codeword.

25. The method of claim 24, further comprising decoding the unmixed codeword blocks.

26. The method of claim 24, wherein the condensed CQI further comprises a differential CQI, and wherein the base CQI and the differential CQI are based at least upon a signal-to-noise ratio (SNR) or signal-to-interference-plus-noise ratio (SINR).

27. A non-transitory machine-readable medium having stored thereon machine-executable instructions for:
grouping transmit antennas based upon a correspondence between codewords and layers;
shuffling codeword blocks across antenna groupings based upon symmetrical permutations of the groupings;
transmitting the shuffled codeword blocks via a forward link channel through the transmit antennas;
receiving a condensed feedback metric relating to the transmission of the shuffled codeword blocks, wherein the condensed feedback metric comprises a condensed channel quality indicator (CQI) that comprises a base CQI reflecting a signal quality metric of both a first decoded codeword and a second decoded codeword; and
adjusting subsequent transmissions based at least in part on the received condensed feedback metric,
wherein shuffling codeword blocks comprises symmetrically permuting codewords over all groupings such that each codeword transmits in part over all antennas.

* * * * *